(12) United States Patent
Klish et al.

(10) Patent No.: US 11,948,125 B2
(45) Date of Patent: Apr. 2, 2024

(54) SENSOR-BASED OBJECT STATUS DETERMINATION

(71) Applicant: VERIZON PATENT AND LICENSING INC., Basking Ridge, NJ (US)

(72) Inventors: Aaron John Klish, Savoy, IL (US); Jon Kilroy, Mahomet, IL (US); Emily Bernotas, Urbana, IL (US); Richard Pace, Champaign, IL (US); Kima Kheirolomoom, Urbana, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 404 days.

(21) Appl. No.: 16/519,436

(22) Filed: Jul. 23, 2019

(65) Prior Publication Data
US 2021/0027237 A1 Jan. 28, 2021

(51) Int. Cl.
| | |
|---|---|
| *G06Q 10/087* | (2023.01) |
| *G06F 3/0482* | (2013.01) |
| *G06Q 30/0601* | (2023.01) |
| *G07C 1/10* | (2006.01) |
| *H04L 12/28* | (2006.01) |
| *H04W 4/35* | (2018.01) |
| *H04W 4/38* | (2018.01) |
| *H04W 8/30* | (2009.01) |

(52) U.S. Cl.
CPC ......... *G06Q 10/087* (2013.01); *G06F 3/0482* (2013.01); *G06Q 30/0633* (2013.01); *G07C 1/10* (2013.01); *H04L 12/2823* (2013.01); *H04W 4/35* (2018.02); *H04W 4/38* (2018.02); *H04W 8/30* (2013.01)

(58) Field of Classification Search
CPC .............. G06Q 10/087; G06Q 30/0633; G06F 3/0482; H04L 12/2823; H04W 4/38; H04W 4/35
See application file for complete search history.

(56) References Cited

U.S. PATENT DOCUMENTS

| | | | |
|---|---|---|---|
| 2002/0075145 A1* | 6/2002 | Hardman | ............ B60C 23/0479 340/448 |
| 2004/0223414 A1* | 11/2004 | Lizzi | ........................ G07C 1/10 368/107 |
| 2005/0146988 A1* | 7/2005 | Dolson | ..................... A61B 5/00 368/10 |
| 2005/0240959 A1* | 10/2005 | Kuhn | ................. H04N 21/4112 348/E7.061 |

(Continued)

*Primary Examiner* — Justin R. Blaufeld

(57) ABSTRACT

One or more computing devices, systems, and/or methods for determining statuses of objects using sensors are provided. For example, a first signal is received from a first device comprising a first sensor. The first signal is indicative of a first identifier associated with a first object that the first device is coupled to and/or one or more first properties detected by the first sensor. A first status associated with the first object is determined based upon the first identifier and/or the one or more first properties. In an example, a system comprises a first device coupled to a first object. The first device comprises a first sensor configured to detect one or more first properties of the first object. The first device comprises a first transmitter configured to transmit a first signal indicative of the one or more first properties and/or a first identifier associated with the first object.

20 Claims, 9 Drawing Sheets

(56) References Cited

U.S. PATENT DOCUMENTS

| | | | |
|---|---|---|---|
| 2006/0046711 A1* | 3/2006 | Jung | H04W 4/38 |
| | | | 455/423 |
| 2006/0186201 A1* | 8/2006 | Hart | G07C 1/10 |
| | | | 235/376 |
| 2010/0033142 A1* | 2/2010 | Roberts | H02K 35/00 |
| | | | 322/40 |
| 2012/0054672 A1* | 3/2012 | McDowell | G09B 17/003 |
| | | | 715/803 |
| 2013/0007626 A1* | 1/2013 | Adams | G07C 5/008 |
| | | | 715/738 |
| 2014/0111326 A1* | 4/2014 | Borisenko | G01M 17/02 |
| | | | 340/447 |
| 2015/0057945 A1* | 2/2015 | White | A61B 5/1118 |
| | | | 702/19 |
| 2015/0127556 A1* | 5/2015 | Harada | G06Q 30/01 |
| | | | 705/302 |
| 2015/0278912 A1* | 10/2015 | Melcher | H04L 63/107 |
| | | | 705/26.7 |
| 2016/0058337 A1* | 3/2016 | Blahnik | A61B 5/1123 |
| 2017/0345246 A1* | 11/2017 | Torresani | G06N 20/00 |
| 2018/0220207 A1* | 8/2018 | Michel | G08B 25/10 |
| 2018/0220283 A1* | 8/2018 | Condeixa | H04L 67/12 |
| 2018/0256078 A1* | 9/2018 | Vaterlaus | A61B 5/7435 |
| 2018/0263288 A1* | 9/2018 | Goldstein | A61M 11/042 |
| 2018/0322449 A1* | 11/2018 | Schiller | G06Q 30/0633 |
| 2018/0336513 A1* | 11/2018 | Smith | G05B 19/406 |
| 2019/0167400 A1* | 6/2019 | Barnes | A46B 15/0012 |
| 2019/0209747 A1* | 7/2019 | Analytis | A61M 1/062 |
| 2019/0238360 A1* | 8/2019 | Laskowitz | G01G 19/64 |
| 2019/0347181 A1* | 11/2019 | Cranfill | G06F 21/629 |
| 2019/0364398 A1* | 11/2019 | Castonzo | H04W 4/029 |
| 2021/0241649 A1* | 8/2021 | Kinnunen | A61B 5/02055 |

\* cited by examiner

SENSOR-BASED OBJECT STATUS DETERMINATION

BACKGROUND

One or more individuals of a household may interact with various objects, such as washing and/or cleaning products, cosmetic products, pill containers, food packages, toys, books, etc. A user may want to keep track of statuses of the objects (e.g., how much soap is left in a soap container, how much time a book is being read, etc.).

SUMMARY

In accordance with the present disclosure, one or more computing devices and/or methods are provided. In an example, a first signal is received from a first device comprising a first sensor. The first signal is indicative of a first identifier associated with a first object that the first device is coupled to and/or one or more first properties detected by the first sensor. A first status associated with the first object is determined based upon the first identifier and/or the one or more first properties (e.g., the first status may be associated with an amount of product stored inside the first object and/or a usage event associated with the first object).

In an example, a system is provided. The system comprises a first device coupled to a first object. The first device comprises a first sensor configured to detect one or more first properties of the first object. The first device comprises a first transmitter configured to transmit a first signal indicative of the one or more first properties and/or a first identifier associated with the first object.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
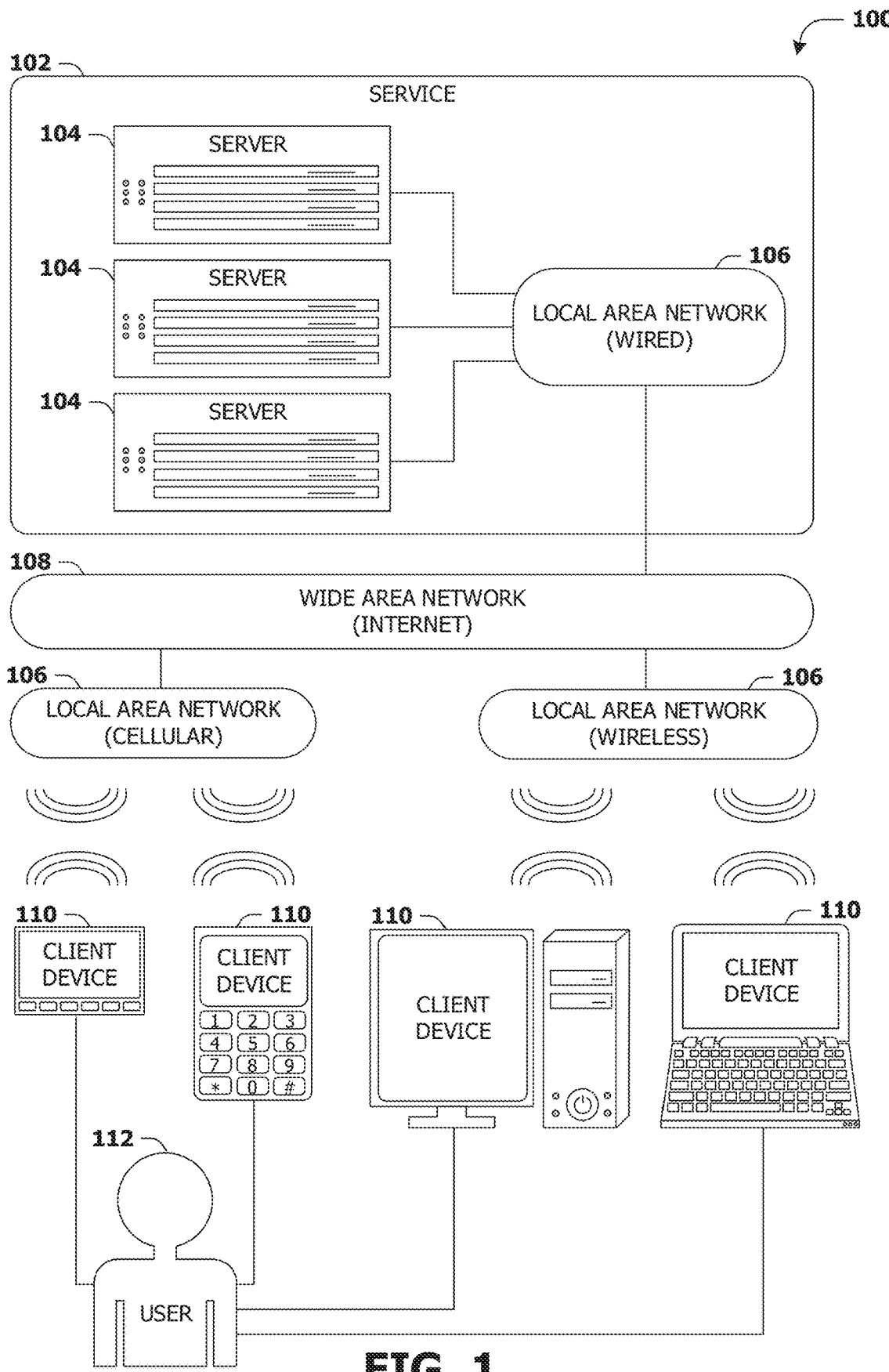
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
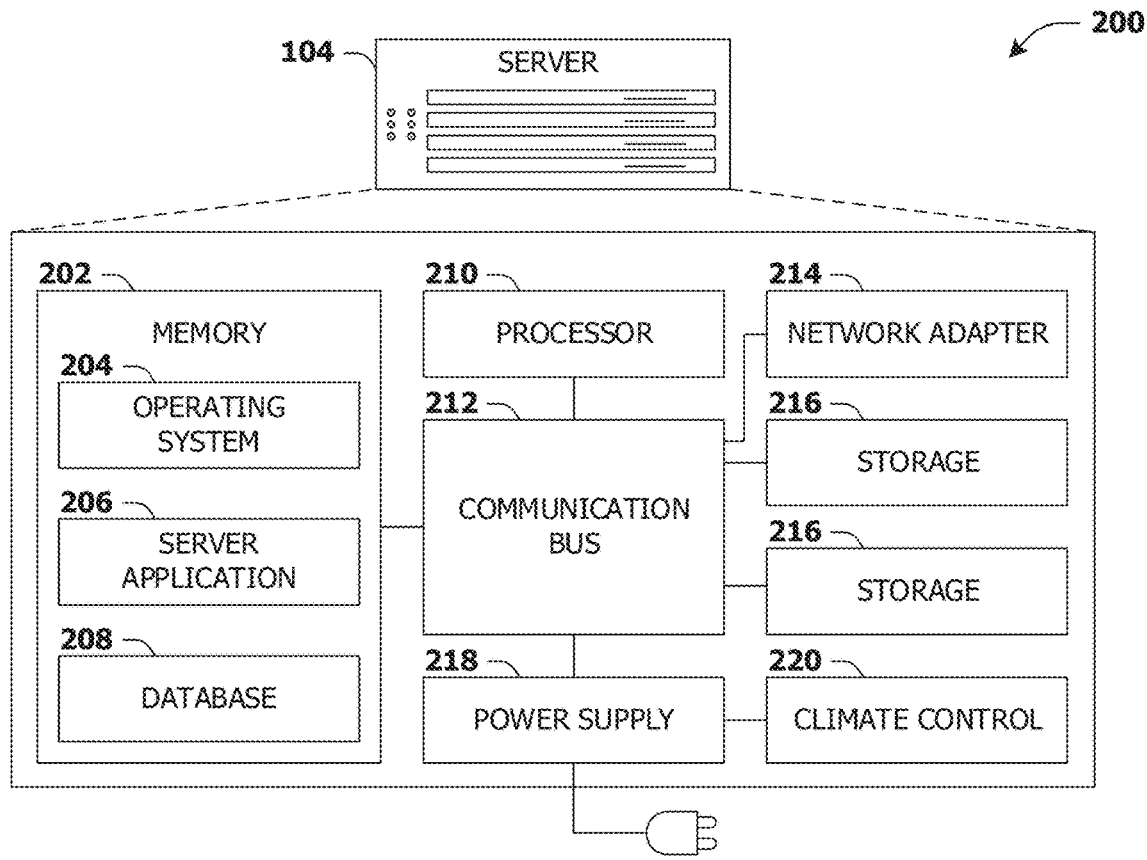
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
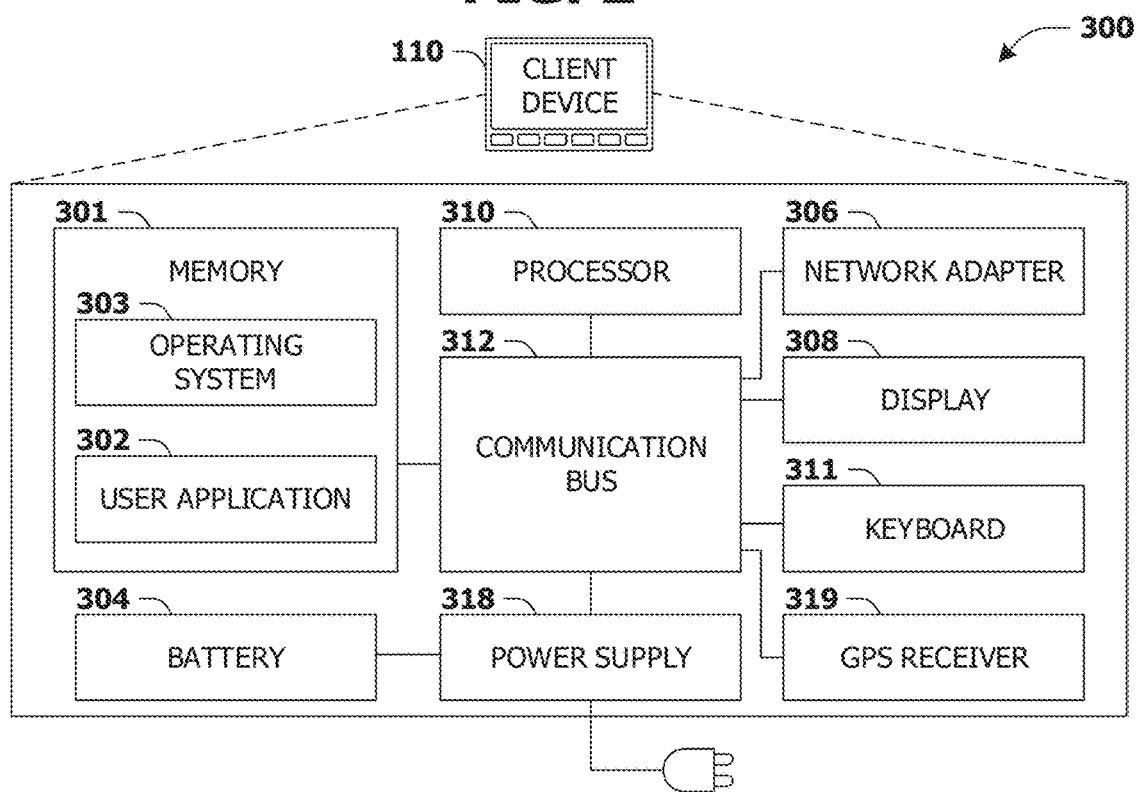
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle, a tool or a residence. The client device 110 may serve the user in a variety of roles, such as a workstation, kiosk, media player, gaming device, a tool and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques are provided for determining statuses of objects using sensors. For example, one or more members of a household may use and/or interact with various objects, such as washing and/or cleaning products, cosmetic products, pill containers, food packages, toys, books, etc. When an object, such as a soap container, is completely depleted of product (e.g., soap) and/or close to being completely depleted of product (e.g., soap), the household may be required to restock the object. For example, a shopping item (e.g., another soap container) corresponding to the object may be purchased from one or more of a store, an online shopping system, etc. However, keeping track of which objects need to be restocked, and when the objects should be restocked, may be difficult for the household. For example, during a visit to a store, a member of the household may not be aware of a shampoo container being completely depleted and/or close to being completely depleted, and thus, the member of the household may not purchase shampoo, causing an inconvenience to the household. Further, a member of the household may want to keep track of usage of various objects of the household. For example, the member of the household may want to keep track of how much time is spent interacting with a book, a toy, etc. by one or more members of the household.

Thus, in accordance with one or more of the devices and/or techniques presented herein, a plurality of devices may be coupled to a plurality of objects associated with the household. In some examples, a first device of the plurality of devices may be coupled to a first object of the plurality of objects. The first device may comprise a first sensor configured to detect one or more first properties of the first object. For example, the one or more first properties may correspond to one or more of a weight associated with the first object, a pressure associated with the first object, motion of the first device (and/or the first object), an acceleration of the motion of the first device (and/or the first object), an ambient light level, a temperature, a humidity level, an altitude, etc. In some examples, the first device may comprise a first transmitter configured to transmit a first signal indicative of the one or more first properties and/or a first identifier associated with the first object. In some examples, a first status associated with the first object may be determined based upon the first identifier and/or the one or more first properties.

In some examples, the first status may correspond to an amount of product stored inside the first object (e.g., the first object may correspond to a soap container and/or the amount of product may correspond to an amount of soap inside the soap container). In some examples, the amount of product stored inside the first object may be compared with a threshold amount of product associated with the first object. An indication of the first object may be stored in a shopping list based upon a determination that the amount of product does not meet the threshold amount of product (e.g., the amount of product may not meet the threshold amount of product if the amount of product corresponds to less than 25% of an initial amount of product of the first object prior to an initial use of the first object). The shopping list may be indicative of one or more objects (comprising the first object) that are associated with one or more amounts of product that do not meet one or more threshold amounts of product). A purchase of one or more shopping items corresponding to the shopping list may be facilitated. For example, an indication of a store that sells the one or more shopping items may be displayed via a client device associated with the household. Alternatively and/or additionally, a shopping interface may be displayed via the client device comprising an indication of the one or more shopping items and/or a selectable input corresponding to purchasing the one or more shopping items.

Alternatively and/or additionally, the first status may be associated with a usage event associated with the first object (e.g., the first object may correspond to a book and/or a baseball bat and/or the usage event may correspond to the book and/or the baseball bat being used and/or interacted with). In some examples, usage information associated with the first object may be determined based upon a plurality of usage events associated with the first object. The usage information may be displayed via the client device. In some examples, the usage information may be indicative of one or more of a rate at which the first object is used and/or interacted with, times during which the first object is used and/or interacted with, an amount of time that the first object is used and/or interacted with, etc.

Figure 4:
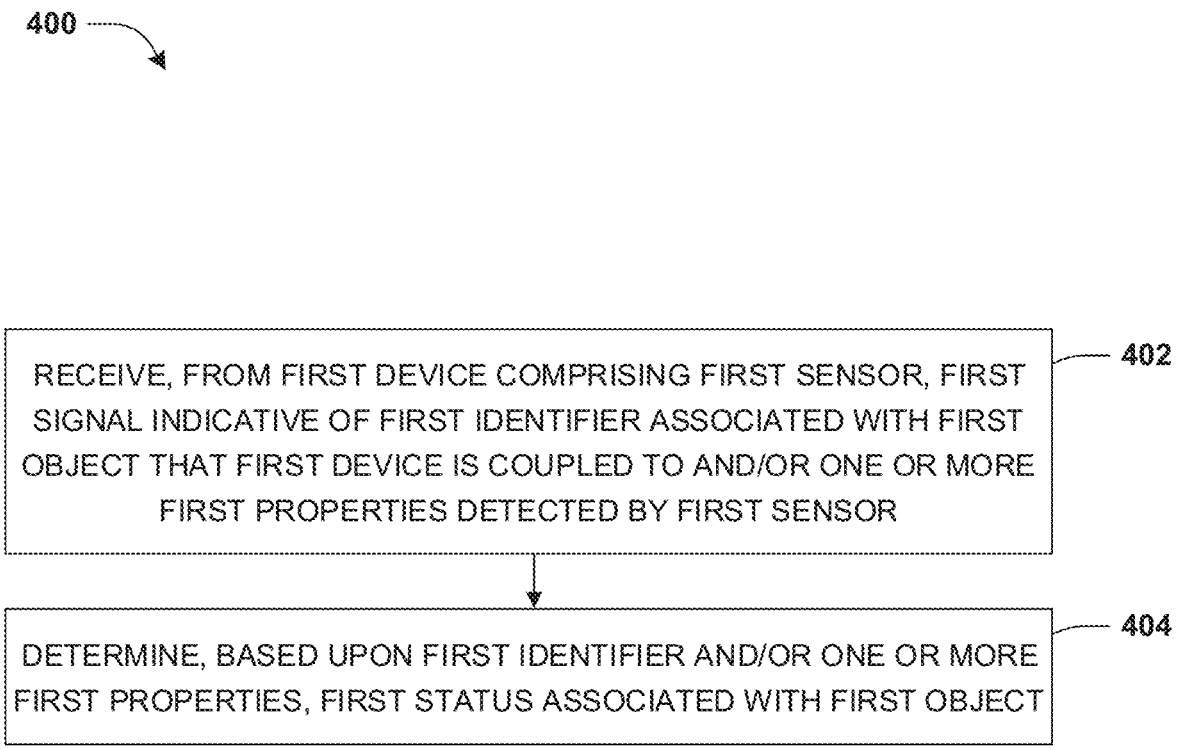
FIG. 4 is a flow chart illustrating an example method for determining statuses of objects using sensors.

An embodiment of determining statuses of objects using sensors is illustrated by an example method 400 of FIG. 4. One or more devices may be coupled to one or more objects. The one or more objects may be used and/or interacted with by one or more individuals of a household, an office and/or a public area. In some examples, the one or more devices may be used for determining and/or keeping track of statues of the one or more objects. For example, a status of an object of the one or more objects may be indicative of an amount of product stored inside the object. Alternatively and/or additionally, a status of an object of the one or more objects may be associated with usage and/or interactions with the object.

In some examples, a first device of the one or more devices may be coupled to a first object of the one or more objects. The first device may comprise a first sensor configured to detect one or more first properties of the first object. In some examples, the first sensor may comprise one or more of a pressure sensor configured to detect and/or measure a pressure associated with the first object (e.g., a pressure of gases and/or liquids stored inside the first object), a temperature sensor configured to detect and/or measure a temperature of a region of the first object (adjacent to the temperature sensor), a weight sensor (e.g., a load cell) configured to detect and/or measure a weight of the first object, a motion sensor configured to detect and/or measure motion of the first device and/or the first object, an acceleration sensor (e.g., an accelerometer) configured to detect and/or measure an acceleration of the motion of the first device, a light sensor configured to detect and/or measure an ambient light level, an altitude sensor configured to detect and/or measure an altitude of the first device and/or the first object, a humidity sensor (e.g., a hygrometer) configured to detect and/or measure a level of humidity associated with the first object (e.g., a level of humidity surrounding the first device), a strain sensor (e.g., a strain gauge) configured to detect and/or measure a strain associated with the first object (e.g., a measure of deformation of a material of the first object), a mechanical stress sensor configured to detect and/or measure a stress associated with the first object, etc.

In some examples, the one or more first properties may correspond to one or more of the pressure associated with the first object, a change of the pressure associated with the first object, the temperature of the region of the first object (adjacent to the temperature sensor), the temperature meeting a temperature threshold, the temperature not meeting the temperature threshold, a change of the temperature, the weight of the first object, a change of the weight of the first object, the motion of the first device and/or the first object, a change of the motion of the first device and/or the first object, the motion of the first device and/or the first object meeting a threshold motion level, the motion of the first device and/or the first object not meeting the threshold motion level, a change of the motion of the first device and/or the first object, the acceleration of the motion of the first device and/or the first object, the acceleration of the motion of the first device and/or the first object meeting a threshold acceleration level, the acceleration of the motion of the first device and/or the first object not meeting the threshold acceleration level, a change of the acceleration of the motion of the first device and/or the first object, the ambient light level, the ambient light level meeting a threshold ambient light level, the ambient light level not meeting the threshold ambient light level, a change of the ambient light level, the altitude of the first device and/or the first object, a change of the altitude of the first device and/or the first object, the level of humidity associated with the first object, a change of the level of humidity associated with the first object, the strain associated with the first object, the strain meeting a threshold strain level, a change of the strain associated with the first object, the stress associated with the first object, the stress meeting a threshold stress level, a change of the stress associated with the first object, etc.

In some examples, the first device may comprise a first transmitter configured to transmit a first signal indicative of the one or more first properties and/or a first identifier associated with the first object. In some examples, the first signal may be transmitted using an omnidirectional antenna structure of the first device. Alternatively and/or additionally, the first signal may be transmitted using one or more unidirectional antenna structures of the first device.

In some examples, an area of a first side of the first device and an area of a second side of the first device, opposing the first side of the first device, may both be less than (and/or greater than) 1 square inch. Alternatively and/or additionally, a thickness of the first device (e.g., a distance between the first side and the second side) may be less than (and/or greater than) 0.25 inches.

In some examples, an adhesive (e.g., one or more of a pressure sensitive adhesive, a solvent-based adhesive, a polymer dispersion adhesive, a contact adhesive, a hot-melt adhesive, etc.) may be applied to the first side (and/or a different side) of the first device. In some examples, the first device may be attached to the first object using the adhesive. Alternatively and/or additionally, the first device may be coupled to the first object without using an adhesive. In some examples, the first device may be coupled to the first object during a manufacturing process of the first object.

In some examples, the first device may be coupled to an outer surface of the first object. Alternatively and/or additionally, the first device may be coupled to an inner surface of the first object. Alternatively and/or additionally, the first device may be comprised within the first object.

Figure 5A:
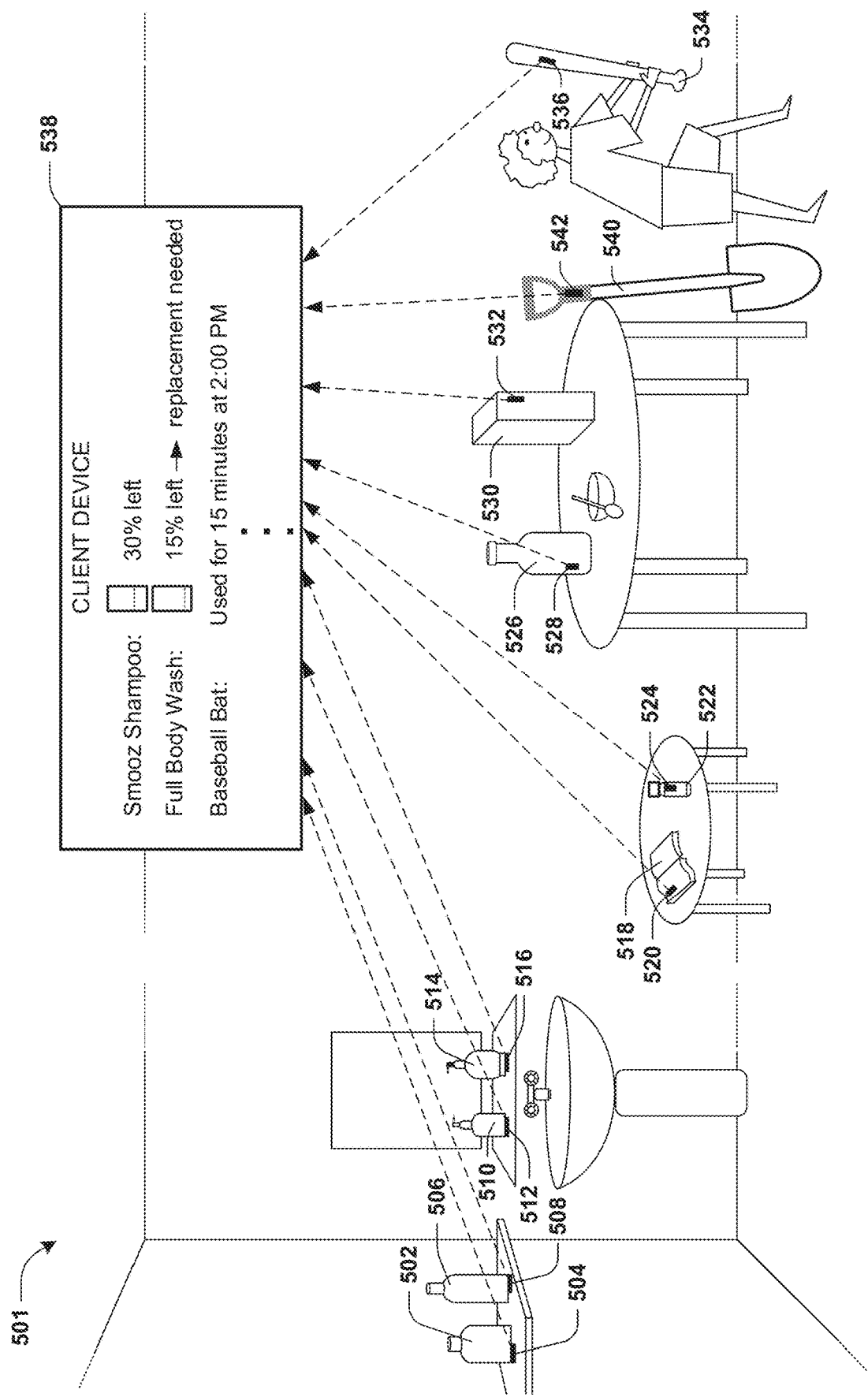
FIG. 5A is a component block diagram illustrating an example system for determining statuses of objects using sensors, where devices coupled to a first set of objects transmit signals to a client device.

In some examples, the first object may correspond to a container (e.g., one or more of a shampoo container 502, a body wash container 506, a soap container 510, a lotion container 514, a pill container 522, a milk container 526, a box of cereal 530, etc. illustrated in FIG. 5A) comprising a product (e.g., one or more of shampoo, body wash, soap, etc.) and/or the one or more first properties detected by the first sensor of the first device may be used for determining an amount of product stored inside the first object. The first sensor may comprise the weight sensor. Alternatively and/or additionally, the weight sensor may be coupled to a bottom surface of the first object (e.g., a bottom of an outer surface of the container). For example, the weight sensor may be positioned between the first object and a surface upon which the first object is placed. The weight sensor may detect and/or measure the weight of the first object. Alternatively and/or additionally, the first sensor may comprise the pressure sensor. The pressure sensor may be coupled to the inner surface of the first object (e.g., inside the first container). The pressure sensor may detect and/or measure the pressure associated with the first object. The amount of product stored inside the first object may be determined based upon the weight of the first object and/or the pressure associated with the first object.

In some examples, the one or more first properties detected by the first sensor of the first device may be used for determining a usage event associated with the first object. In an example where the first object is a book, the usage event may correspond to the book being opened, read, interacted with, held and/or moved. In an example where the first object is a container (e.g., a box of cereal, a pill and/or medicine container, etc.), the usage event may correspond to the container being opened, interacted with, held and/or moved. In an example where the first object is a toy (e.g., one or more of a puppet, a doll, etc.) and/or sports equipment (e.g., one or more of a baseball bat, a tennis racket, a ping pong paddle, etc.), the usage event may correspond to the toy and/or the sports equipment being played with, used, interacted with, moved and/or held. In an example where the first object is a tool (e.g., one or more of a shovel, a hammer, a screw driver, a drill, a fencing tool, a compactor, automatic machinery, etc.), the usage event may correspond to the tool being used, interacted with and/or held and/or stress and/or strain being exerted on the tool.

In some examples, the first sensor may comprise the light sensor. Alternatively and/or additionally, the light sensor may be coupled to an inner surface of the first object. In the example where the first object is the book, the light sensor may be coupled to an inner portion of a cover (e.g., a front cover and/or a back cover) of the book and/or the light sensor may be coupled to one or more sheets of the book. The light sensor may detect and/or measure the ambient light level. For example, the ambient light level may change as a result of the book being opened and/or closed. For example, the ambient light level meeting the threshold ambient light level may be indicative of the book being opened, read and/or interacted with. In some examples, the first signal may be transmitted responsive to the book being opened and/or the ambient light level meeting the threshold ambient light level. Alternatively and/or additionally, the first signal may be transmitted responsive to a change of the ambient light level (e.g., the book being closed and/or the book being opened). In some examples, the first signal may be indicative of a change of the ambient light level, the ambient light level and/or the ambient light level meeting the threshold ambient light level. The usage event may be determined based upon the change of the ambient level, the ambient light level and/or based upon the ambient level meeting the threshold ambient light level. In an example, the usage event may correspond to the book being closed if the first signal is indicative of ambient light level decreasing from above the threshold ambient light level to below the threshold ambient light level. Alternatively and/or additionally, the usage event may correspond to the book being opened if the first signal is indicative of ambient light level increasing from below the threshold ambient light level to above the threshold ambient light level.

In the example where the first object is the container, the light sensor may be coupled to an inner surface of the container. The light sensor may detect and/or measure the ambient light level. For example, the ambient light level may change as a result of the container being opened and/or closed. For example, the ambient light level meeting the threshold ambient light level may be indicative of the container being opened and/or interacted with. In some examples, the first signal may be transmitted responsive to the container being opened and/or the ambient light level meeting the threshold ambient light level. Alternatively and/or additionally, the first signal may be transmitted responsive to a change of the ambient light level (e.g., the container being closed and/or the container being opened). In some examples, the first signal may be indicative of a change of the ambient light level, the ambient light level and/or the ambient light level meeting the threshold ambient light level. The usage event may be determined based upon the change of the ambient light level, the ambient light level and/or based upon the ambient level meeting the threshold ambient light level. In an example, the usage event may correspond to the container being closed if the first signal is indicative of ambient light level decreasing from above the threshold ambient light level to below the threshold ambient light level. Alternatively and/or additionally, the usage event may correspond to the container being opened if the first signal is indicative of ambient light level increasing from below the threshold ambient light level to above the threshold ambient light level.

Alternatively and/or additionally, the first sensor may comprise the motion sensor and/or the acceleration sensor. The motion sensor and/or the acceleration sensor may be coupled to an outer surface of the first object and/or an inner surface of the first object. Alternatively and/or additionally, the motion sensor and/or the acceleration sensor may be comprised within the first object (e.g., in an example where the first object is a baseball bat, the first sensor may be inside of the baseball bat).

The motion sensor and/or the acceleration sensor may detect and/or measure the motion of the first object and/or the acceleration of the motion of the first object. In some examples, the motion and/or the acceleration meeting the threshold motion level and/or the threshold acceleration level may be indicative of the usage event. In the example where the first object is the book, the motion and/or the acceleration meeting the threshold motion level and/or the threshold acceleration level may be indicative of the book being opened, read and/or interacted with. In the example where the first object is the container, the motion and/or the acceleration meeting the threshold motion level and/or the threshold acceleration level may be indicative of the container being opened, interacted with, held and/or moved. In the example where the first object is the toy and/or the sports equipment, the motion and/or the acceleration meeting the threshold motion level and/or the threshold acceleration level may be indicative of the toy and/or the sports equipment being played with, used, interacted with, moved and/or held.

In some examples, the first signal may be transmitted responsive to the detection of the motion and/or the acceleration and/or responsive to the motion and/or the acceleration meeting the threshold motion level and/or the threshold acceleration level. In some examples, the first signal may be indicative of the motion and/or the acceleration meeting the threshold motion level and/or the threshold acceleration level. Alternatively and/or additionally, the first signal may be indicative of the motion and/or the acceleration. Alternatively and/or additionally, the first signal may be indicative of the motion and/or the acceleration not meeting the threshold motion level and/or the threshold acceleration level. In some examples, the usage event may be determined based upon the motion and/or the acceleration. Alternatively and/or additionally, the usage event may be determined based upon the motion and/or the acceleration meeting the threshold motion level and/or the threshold acceleration level.

Alternatively and/or additionally, the first sensor may comprise the temperature sensor. In some examples, the temperature detected and/or measured by the temperature sensor may change as a result of the first object being touched and/or held by an individual. For example, a change of temperature may be indicative of a usage event. Alternatively and/or additionally, the temperature meeting the temperature threshold may be indicative of the usage event. In the example where the first object is the book, the temperature meeting the temperature threshold may be indicative of the book being held, read and/or interacted with. In the example where the first object is the container, the temperature meeting the temperature threshold may be indicative of may be indicative of the container being opened, interacted with and/or held. In the example where the first object is the toy and/or the sports equipment, the temperature meeting the temperature threshold may be indicative of the toy and/or the sports equipment being played with, used, interacted with and/or held.

In some examples, the first signal may be transmitted responsive to responsive to detection of a change of the temperature and/or responsive to the temperature meeting the threshold temperature. In some examples, the first signal may be indicative of the temperature meeting the threshold temperature. Alternatively and/or additionally, the first signal may be indicative of the temperature. Alternatively and/or additionally, the first signal may be indicative of the temperature not meeting the threshold temperature. In some examples, the usage event may be determined based upon the temperature and/or based upon the temperature meeting the threshold temperature. In an example, the usage event may correspond to the first object not being held and/or used if the first signal is indicative of the temperature decreasing from above the threshold temperature to below the threshold temperature. Alternatively and/or additionally, the usage event may correspond to the first object being held and/or used if the first signal is indicative of the temperature increasing from below the threshold temperature to above the temperature.

Alternatively and/or additionally, the first sensor may comprise the strain sensor and/or the stress sensor. The strain sensor and/or the stress sensor may be coupled to an outer surface of the first object and/or an inner surface of the first object. Alternatively and/or additionally, the strain sensor and/or the stress sensor may be comprised within the first object.

The strain sensor and/or the stress sensor may detect and/or measure the strain associated with the first object and/or the stress associated with the first object. In some examples, the strain and/or the stress meeting the threshold strain level and/or the threshold stress level may be indicative of the usage event. In the example where the first object is the tool, the strain and/or the stress meeting the threshold strain level and/or the threshold stress level may be indicative of the tool being used (e.g., the shovel being used for digging), a force being applied to the tool and/or the tool being misused (e.g., the shovel being used in such a way that a risk of the shovel breaking increases, such as a handle of the shovel breaking off).

In some examples, the first signal may be transmitted responsive to the detection of the strain and/or the stress and/or responsive to the strain and/or the stress meeting the threshold strain level and/or the threshold stress level. In some examples, the first signal may be indicative of the strain and/or the stress meeting the threshold strain level and/or the threshold stress level. Alternatively and/or additionally, the first signal may be indicative of the strain and/or the stress. Alternatively and/or additionally, the first signal may be indicative of the strain and/or the stress not meeting the threshold strain level and/or the threshold stress level. In some examples, the usage event may be determined based upon the strain and/or the stress. Alternatively and/or additionally, the usage event may be determined based upon the strain and/or the stress meeting the threshold strain level and/or the threshold stress level.

In some examples, the first device may transmit the first signal to a network node of a wireless local area network (provided by a cellular provider). In some examples, the network node may correspond to one or more of a Local Area Data Network (LADN), a base station, a transmission and reception point (TRP), etc. For example, the first device may transmit the first signal using a cellular network protocol standard and/or a wireless radio frequency technology, such as one or more of 3G, 4G, 5G New Radio (NR), machine to machine (M2M) communication (e.g., LTE-M), Internet of Things (IoT) communication (e.g., Narrowband Internet of Things (NB-IoT)), LoRa (Long Range) Technology, etc.

Alternatively and/or additionally, the first device may transmit the first signal to a client device. In some examples, the client device may correspond to one or more of a computer, a smartphone, a smart speaker, a smart television, a laptop, a router, a modem and/or a different device capable of performing wireless communication. In some examples, the first device may transmit the first signal to the client device via a wireless local area network, such as a Wi-Fi network and/or a Bluetooth personal area network. Alternatively and/or additionally, the first device may transmit the first signal to the client device using Bluetooth Low Energy technology and/or Bluetooth mesh networking technology.

In some examples, the first transmitter may transmit the first signal responsive to the first sensor triggering the first transmitter to transmit the first signal. In an example where the first sensor comprises the pressure sensor and/or the weight sensor and/or the first signal is used for determining the amount of product stored inside the first object, the first transmitter may be triggered to transmit the first signal responsive to the first sensor detecting a change of the pressure associated with the first object and/or a change of the weight of the first object (and/or a change of the amount of product stored inside the first object). The first signal may be indicative of the pressure associated with the first object, the weight of the first product and/or the amount of product stored inside the first object.

Alternatively and/or additionally, the first transmitter may be triggered to transmit the first signal responsive to the first sensor detecting the pressure meeting a first pressure threshold and/or the weight meeting a first weight threshold. For example, the pressure may meet the first pressure threshold if the pressure is less than or equal to the first pressure threshold. Alternatively and/or additionally, the weight may meet the first weight threshold if the weight is less than or equal to the first weight threshold. In some examples, the first pressure threshold and/or the first weight threshold may correspond to a first defined amount of product. In some examples, the first signal may be indicative of the pressure meeting the first pressure threshold and/or the weight meeting the first pressure threshold. In some examples, it may be determined that the amount of product stored inside the first object is less than or equal to the first defined amount of product based upon the first signal. Alternatively and/or additionally, the first transmitter may be triggered to transmit the first responsive to the first sensor detecting the pressure meeting a second pressure threshold and/or the weight meeting a second weight threshold. In some examples, the second pressure threshold and/or the second weight threshold may be less than the first pressure threshold and/or the first weight threshold. In some examples, the second pressure threshold and/or the second weight threshold may correspond to a second defined amount of product, less than the first defined amount of product. In some examples, the first signal may be indicative of the pressure meeting the second pressure threshold and/or the weight meeting the second pressure threshold. In some examples, it may be determined that the amount of product stored inside the first object is less than or equal to the second defined amount of product based upon the second signal.

Alternatively and/or additionally, the first sensor may comprise the motion sensor, the acceleration sensor, the light sensor and/or the temperature sensor. In some examples, the first transmitter may be triggered to transmit the first signal responsive to the first sensor detecting one or more indicators of the first object being held, used and/or depleted. The one or more indicators may correspond to the motion meeting the threshold motion level, the acceleration meeting the threshold acceleration level, a change of the ambient light level and/or a change of the temperature. Alternatively and/or additionally, the pressure sensor and/or the weight sensor may be triggered to measure and/or detect the pressure associated with the first object and/or the weight of the first object responsive to detecting the one or more indicators of the first object being held, used and/or depleted. In some examples, responsive to the pressure sensor and/or the weight sensor measuring and/or detecting the pressure associated with the first object and/or the weight of the first object, the first transmitter may be triggered to transmit the first signal indicative of the pressure associated with the first object, the weight of the first product and/or the amount of product stored inside the first object.

Alternatively and/or additionally, the pressure sensor and/or the weight sensor may periodically perform pressure and/or weight measurements. Responsive to performing a measurement of the pressure and/or weight measurements, the first transmitter may be triggered to transmit a signal. Alternatively and/or additionally, responsive to performing a pressure and/or weight measurement and/or determining that the pressure associated with the first object and/or the weight of the first object is different than a previous pressure and/or weight measurement, the first transmitter may be triggered to transmit a signal. In some examples, the first device may comprise memory and/or may store one or more measurements on the memory.

In an example where the first object is the container and/or the book (and/or a different object), the first sensor comprises the light sensor and/or the first signal is used for determining a usage event associated with the first object, the first transmitter may be triggered to transmit the first signal responsive to a change of the ambient light level. For example, if the ambient light level decreases (e.g., decreases from above the threshold ambient light level to below the threshold ambient light level), the first signal may be indicative of the container and/or the book (and/or the different object) being closed, the ambient light level decreasing to below the threshold ambient light level, the ambient light level and/or a decrease of the ambient light level. Alternatively and/or additionally, if the ambient light level increases (e.g., increases from below the threshold ambient light level to above the threshold ambient light level), the first signal may be indicative of the container and/or the book (and/or the different object) being opened, the ambient light level increasing to above the threshold ambient light level, the ambient light level and/or an increase of the ambient light level.

In an example where the first sensor comprises the motion sensor and/or the acceleration sensor and/or the first signal is used for determining a usage event associated with the first object, the first transmitter may be triggered to transmit the first signal responsive to the first sensor detecting the motion and/or the acceleration meeting the threshold motion level and/or the threshold acceleration level. For example, the first signal may be indicative of the motion, the acceleration and/or one or more of the first object being held, interacted with, read, moved, played with, etc.

In an example where the first sensor comprises the temperature sensor and/or the first signal is used for determining a usage event associated with the first object, the first transmitter may be triggered to transmit the first signal responsive to the first sensor detecting a change of the temperature detected and/or measured by the temperature sensor. For example, if the temperature decreases (e.g., decreases from above the threshold temperature to below the threshold temperature), the first signal may be indicative of one or more of the first object being held, interacted with, read, moved, played with, etc. Alternatively and/or additionally, if the temperature increases (e.g., increases from below the threshold temperature to above the threshold temperature), the first signal may be indicative of one or more of the first object not being held, the first object not being interacted with, the first object (e.g., the book) not being read, the first object not being moved, the first object not being played with, etc.

In an example where the first sensor comprises the strain sensor and/or the stress sensor and/or the first signal is used for determining a usage event associated with the first object, the first transmitter may be triggered to transmit the first signal responsive to the first sensor detecting the strain and/or the stress meeting the threshold strain level and/or the threshold stress level. For example, the first signal may be indicative of the strain, the stress and/or one or more of the first object being used, misused, interacted with, held, etc. and/or a force being applied to the tool.

In some examples, the first transmitter may transmit the first signal responsive to the first transmitter being triggered to transmit the first signal. For example, the first signal may be transmitted immediately upon the first transmitter being triggered to transmit the first signal. Alternatively and/or additionally, the first signal may be transmitted with a delay (e.g., the first signal may be transmitted a duration of time after the first transmitter is triggered to transmit the first signal). Alternatively and/or additionally, the first device may perform sensing (using a receiver of the first device) to detect the client device. The first signal may be transmitted (to the client device) based upon and/or responsive to detection of the client device. Alternatively and/or additionally, responsive to not detecting the client device (and/or responsive to not detecting one or more client devices configured for reception of the first signal), the first device may store the first signal (in the memory of the first device). After storing the first signal, the first device may (periodically) perform sensing to detect the client device. Responsive to detecting the client device, the first device may transmit the first signal (and/or one or more other stored signals) to the client device.

In some examples, responsive to receiving the first signal, the client device may transmit the first signal to a server associated with an object status system. For example, the first signal may be relayed (by the client device) to the server. In some examples, the first device may generate a time indication (e.g., a timestamp) indicative of a time that the one or more first properties of the first signal are measured and/or detected by the first device. In some examples, the first signal may comprise the time indication. Alternatively and/or additionally, the first signal may not comprise the time indication (e.g., the first device may not generate the time indication). In some examples where the first signal does not comprise the time indication, the client device may generate a second time indication corresponding to a time of reception of the first signal and/or the client device may transmit the second time indication to the server with the first signal.

In some examples, the first device may be powered by a battery and/or a capacitor. For example, the first sensor may perform one or more measurements and/or the first transmitter may transmit one or more signals using power of the battery and/or the capacitor. Alternatively and/or additionally, the first device may be powered by fluctuations in ambient electromagnetic energy. For example, the first sensor may perform one or more measurements and/or the first transmitter may transmit one or more signals using flux and/or current produced via the fluctuations in ambient electromagnetic energy. Alternatively and/or additionally, the first device may be powered by motion of the first device. For example, the first device may comprise an electric generator that generates power as a result of friction and/or motion of the first device. The first sensor may perform one or more measurements and/or the first transmitter may transmit one or more signals using the power generated by the electric generator.

At 402, the first signal is received from the first device comprising the first sensor. The first signal is indicative of the first identifier associated with the first object and/or the one or more first properties detected and/or measured by the first sensor. For example, the first signal may be received by the client device. Alternatively and/or additionally, the first signal may be received by the server.

At 404, a first status associated with the first object may be determined based upon the first identifier and/or the one or more first properties. In some examples, the first status may be determined by the client device (and/or a different client device). Alternatively and/or additionally, the first status may be determined by the server associated with the object status system.

In some examples, the first status may correspond to the amount of product stored inside the first object (e.g., the first object may correspond to a soap container and/or the amount of product may correspond to an amount of soap inside the soap container). In some examples, an object database may be analyzed based upon the first identifier associated with the first object to determine one or more characteristics of the first object. For example, the one or more characteristics may correspond to one or more of an initial amount of product of the first object (prior to product of the first object being depleted and/or used), an initial weight of the first object (prior to product of the first object being depleted and/or used), an initial pressure associated with the first object (prior to the product of the first object being depleted and/or used), the first defined amount of product associated with the first pressure threshold and/or the first weight threshold, the second amount of product associated with the second pressure threshold and/or the second weight threshold, etc.

For example, the first signal may be indicative of the pressure associated with the first object and/or the weight of the first object. In some examples, the amount of product stored inside the first product may be determined based upon performing one or more operations (e.g., mathematical operations) using the pressure, the weight, the initial pressure and/or the initial weight. Alternatively and/or additionally, the one or more characteristics may be indicative of a set of defined amounts of product stored inside the first object, a set of weight levels associated with the set of defined amounts of product and/or a set of pressure levels associated with the set of defined amounts of product. For example, each pressure level of the set of pressure levels may be associated with a defined amount of product of the set of defined amounts of product. Alternatively and/or additionally, each weight level of the set of weight levels may be associated with a defined amount of product of the set of defined amounts of product. For example, the pressure indicated by the first signal may be compared with the set of pressure levels to identify a pressure level of the set of pressure levels matching the pressure and/or a defined amount of product of the set of defined amounts of product associated with the pressure level. Alternatively and/or additionally, the weight indicated by the first signal may be compared with the set of weight levels to identify a weight level of the set of weight levels matching the weight and/or the defined amount of product of the set of defined amounts of product associated with the weight level. The amount of product stored inside the first object may be determined based upon the defined amount of product of the set of defined amounts of product.

Alternatively and/or additionally, the first signal may be indicative of the pressure meeting the first pressure threshold (e.g., the pressure being less than or equal to the first pressure threshold) and/or the weight meeting the first weight threshold (e.g., the weight being less than or equal to the first weight threshold). In some examples, it may be determined that the amount of product stored inside the first object is less than or equal to the first defined amount of product based upon the first signal.

Alternatively and/or additionally, the first signal may be indicative of the pressure meeting the second pressure threshold (e.g., the pressure being less than or equal to the second pressure threshold) and/or the weight meeting the second weight threshold (e.g., the weight being less than or equal to the second weight threshold). In some examples, it may be determined that the amount of product stored inside the first object is less than or equal to the second defined amount of product based upon the first signal.

In some examples, the first status may be indicative of the amount of product stored inside the first object. For example, the first status and/or the amount of product stored inside the first object may correspond to a weight of product (e.g., soap, detergent, shampoo, cereal, perfume, etc.) stored inside the first object. Alternatively and/or additionally, the first status and/or the amount of product stored inside the first object may correspond to a mass of product stored inside the first object. Alternatively and/or additionally, the first status and/or the amount of product stored inside the first object may correspond to a volume (e.g., cubic meter, liter, milliliter, fluid ounce, etc.) of product stored inside the first object. Alternatively and/or additionally, the first status and/or the amount of product stored inside the first object may correspond to a proportion, a percentage and/or a ratio of the amount of product with respect to the initial amount of product of the first object (prior to product of the first object being depleted and/or used). For example, the first status may indicate that the amount of product stored inside the first object corresponds to 30% of the initial amount of product.

Alternatively and/or additionally, the first status may be indicative of a predicted duration of time until product of the first object is finished (e.g., completely depleted). In some examples, the predicted duration of time may be determined based upon the first signal and/or one or more signals received from the first device prior to receiving the first signal from the first device. For example, a rate of depletion of product of the first object may be determined based upon the first signal and/or the one or more signals. For example, the rate of depletion of product of the first object may be determined responsive to receiving one or more initial signal of the one or more signals. After determining the rate of depletion of product of the first object based upon the one or more initial signals, the rate of depletion of product of the first object may be updated responsive to receiving a signal, different than the one or more initial signals, of the one or more signals and/or responsive to receiving the first signal. For example, the rate of depletion of product of the first object may be determined based upon changes in the amount of product in the first object over time (determined based upon the first signal and/or the one or more signals received prior to receiving the first signal). In some examples, the first status may be indicative of the rate of depletion of product of the first object. For example, the rate of depletion of product may correspond to an average amount of product depleted per duration of time (e.g., per day, per week, per month, etc.).

In some examples, the first status may be associated with the usage event associated with the first object. In an example where the first object is the container and/or the book (and/or a different object) and/or the first sensor comprises the light sensor, the first signal may be indicative of the ambient light level. For example, the first signal may be indicative of the ambient light level increasing (e.g., increasing from below the threshold ambient light level to above the threshold ambient light level). In some examples, the usage event determined based upon the first signal may correspond to the container and/or the book (and/or the different object) being opened and/or used. Alternatively and/or additionally, the usage event may be indicative of a first time associated with the usage event. For example, if the first signal comprises the first time indication, the first time may be determined based upon the first time indication. Alternatively and/or additionally, the first time may be determined based upon a time of reception of the first signal.

Alternatively and/or additionally, a second signal may be transmitted by the first device after the first signal is transmitted. For example, the second signal may be indicative of the ambient light level decreasing (e.g., decreasing from above the threshold ambient light level to below the threshold ambient light level). In some examples, a second usage event may be determined based upon the second signal. In some examples, the second usage event may correspond to the container and/or the book (and/or the different object) being closed and/or not used. Alternatively and/or additionally, the second usage event may be indicative of a second time associated with the second usage event (e.g., if the second signal comprises a second time indication (e.g., a timestamp), the second time may be determined based upon the second time indication). Alternatively and/or additionally, the second time may be determined based upon a time of reception of the second signal. In some examples, it may be determined based upon the first signal (and/or the usage event determined based upon the first signal) and/or the second signal (and/or the second usage event determined based upon the second signal) that the first object is used and/or opened between the first time and the second time.

Alternatively and/or additionally, the first signal may be indicative of the ambient light level meeting the threshold ambient light level and/or a duration of time that the ambient light level meets the threshold ambient light level. For example, a time during which the first object is open and/or used may be determined based upon the duration of time that the ambient light level meets the threshold ambient light level.

Alternatively and/or additionally, a set of signals may be received from the first device. Each signal of the set of signals may be indicative of the ambient light level meeting the threshold ambient light level. For example, each signal of the set of signals may be indicative of a usage event corresponding to the first object being open and/or used. In some examples, the set of signals may correspond to a usage session where the first object is open and/or used (e.g., the usage session may correspond to a period of time during which the first object is used continuously). Alternatively and/or additionally, each signal of the set of signals may be associated with a time, of a set of times associated with the set of signals, associated with a usage event corresponding to the first object being open and/or used. In some examples, the duration of time that the ambient light level meets the threshold ambient light level may be determined based upon the set of signals and/or the set of times. Alternatively and/or additionally, a time during which the first object is open and/or used may be determined based upon the duration of time that the ambient light level meets the threshold ambient light level. Alternatively and/or additionally, the time during which the first object is open and/or used may be determined based upon the set of times (e.g., the time may correspond to a period of time between an initial time of the set of times to a last time of the set of times).

In some examples, the first status may be indicative of one or more of the first object being used and/or open between the first time and the second time, the duration of time that the ambient light level meets the threshold ambient light level, the time during which the first object is used and/or open, etc.

Alternatively and/or additionally, the first status may be indicative of usage information, associated with the first object, determined based upon a plurality of usage events associated with the first object (and/or a plurality of signals received from the first device). For example, the usage information may correspond to one or more of an amount of time that the first object is used and/or open during a period of time (e.g., during a day, during a week, during a month, etc.), an average amount of time that the first object is used and/or open per duration of time (e.g., per day, per week, per month, etc.) averaged over multiple amounts of time associated with multiple periods of time, a quantity of usage sessions associated with the first object during a period of time (e.g., during a day, during a week, during a month, etc.), an average quantity of usage sessions associated with the first object per duration of time (e.g., per day, per week, per month, etc.) averaged over multiple quantities of usage sessions associated with multiple periods of time, a total amount of time that the first object is used and/or open, a total quantity of usage sessions associated with the first object, a plurality of times during which the first object is used and/or open, etc.

In an example where the first sensor comprises the temperature sensor, the first signal may be indicative of the temperature. For example, the first signal may be indicative of the temperature increasing (e.g., increasing from below the threshold temperature to above the threshold temperature). In some examples, the usage event determined based upon the first signal may correspond to the first object being held, interacted with, played with and/or used. Alternatively and/or additionally, the usage event may be indicative of the first time associated with the usage event.

Alternatively and/or additionally, a third signal may be transmitted by the first device after the first signal is transmitted. For example, the third signal may be indicative of the temperature decreasing (e.g., decreasing from above the threshold temperature to below the threshold temperature). In some examples, a third usage event may be determined based upon the third signal. In some examples, the third usage event may correspond to the first object not being held, interacted with, played with and/or used. Alternatively and/or additionally, the third usage event may be indicative of a third time associated with the third usage event (e.g., if the third signal comprises a third time indication (e.g., a timestamp), the third time may be determined based upon the third time indication). Alternatively and/or additionally, the third time may be determined based upon a time of reception of the third signal. In some examples, it may be determined based upon the first signal (and/or the usage event determined based upon the first signal) and/or the third signal (and/or the third usage event determined based upon the third signal) that the first object is held, interacted with, played with and/or used between the first time and the third time.

Alternatively and/or additionally, the first signal may be indicative of the temperature meeting the threshold temperature and/or a duration of time that the temperature meets the threshold temperature. For example, a time during which the first object is held, interacted with, played with and/or used may be determined based upon the duration of time that the temperature meets the threshold temperature.

Alternatively and/or additionally, a set of signals may be received from the first device. Each signal of the set of signals may be indicative of the temperature meeting the threshold temperature. For example, each signal of the set of signals may be indicative of a usage event corresponding to the first object being held, interacted with, played with and/or used. In some examples, the set of signals may correspond to a usage session where the first object is held, interacted with, played with and/or used. Alternatively and/or additionally, each signal of the set of signals may be associated with a time, of a set of times associated with the set of signals, associated with a usage event corresponding to the first object being held, interacted with, played with and/or used. In some examples, the duration of time during which the temperature meets the threshold temperature may be determined based upon the set of signals and/or the set of times. Alternatively and/or additionally, a time during which the first object is held, interacted with, played with and/or used may be determined based upon the duration of time during which the temperature meets the threshold temperature. Alternatively and/or additionally, the time during which the first object is held, interacted with, played with and/or used may be determined based upon the set of times (e.g., the time may correspond to a period of time between an initial time of the set of times to a last time of the set of times).

In some examples, the first status may be indicative of one or more of the first object being held, interacted with, played with and/or used between the first time and the third time, the duration of time that the temperature meets the threshold temperature, the time during which the first object is held, interacted with, played with and/or used, etc.

Alternatively and/or additionally, the first status may be indicative of usage information, associated with the first object, determined based upon a plurality of usage events associated with the first object (and/or a plurality of signals received from the first device). For example, the usage information may correspond to one or more of an amount of time that the first object is held, interacted with, played with and/or used during a period of time (e.g., during a day, during a week, during a month, etc.), an average amount of time that the first object is held, interacted with, played with and/or used per duration of time (e.g., per day, per week, per month, etc.) averaged over multiple amounts of time associated with multiple periods of time, a quantity of usage sessions associated with the first object during a period of time (e.g., during a day, during a week, during a month, etc.), an average quantity of usage sessions associated with the first object per duration of time (e.g., per day, per week, per month, etc.) averaged over multiple quantities of usage sessions associated with multiple periods of time, a total amount of time that the first object is held, interacted with, played with and/or used, a total quantity of usage sessions associated with the first object, a plurality of times during which the first object is held, interacted with, played with and/or used, etc.

In an example where the first sensor comprises the motion sensor and/or the acceleration sensor, the first signal may be indicative of the motion and/or the acceleration. For example, the first signal may be indicative of the motion and/or the acceleration meeting the threshold motion level and/or the threshold acceleration level and/or a duration of time that the motion and/or the acceleration meets the threshold motion level and/or the threshold acceleration level. For example, a time during which the first object is moved, interacted with, played with and/or used may be determined based upon the duration of time that the motion and/or the acceleration meets the threshold motion level and/or the threshold acceleration level.

Alternatively and/or additionally, a set of signals may be received from the first device. Each signal of the set of signals may be indicative of the motion and/or the acceleration meeting the threshold motion level and/or the threshold acceleration level. For example, each signal of the set of signals may be indicative of a usage event corresponding to the first object being moved, interacted with, played with and/or used. In some examples, the set of signals may correspond to a usage session where the first object is moved, interacted with, played with and/or used. Alternatively and/or additionally, each signal of the set of signals may be associated with a time, of a set of times associated with the set of signals, associated with a usage event corresponding to the first object being moved, interacted with, played with and/or used. In some examples, the duration of time that the motion and/or the acceleration meets the threshold motion level and/or the threshold acceleration level may be determined based upon the set of signals and/or the set of times. Alternatively and/or additionally, a time during which the first object is moved, interacted with, played with and/or used may be determined based upon the duration of time that the motion and/or the acceleration meets the threshold motion level and/or the threshold acceleration level. Alternatively and/or additionally, the time during which the first object is moved, interacted with, played with and/or used may be determined based upon the set of times (e.g., the time may correspond to a period of time between an initial time of the set of times to a last time of the set of times).

In some examples, the first status may be indicative of one or more of the duration of time that the motion and/or the acceleration meets the threshold motion level and/or the threshold acceleration level, the time during which the first object is moved, interacted with, played with and/or used, a distance covered by the first object within the time during which the first object is moved, interacted with, played with and/or used (which may be determined based upon the motion and/or the acceleration), etc. In some examples, the distance covered by the first object corresponds to a distance that the first object moves (and/or is moved) within the time during which the first object is moved, interacted with, played with and/or used.

In an example where the first sensor comprises the strain sensor and/or the stress sensor, the first signal may be indicative of the strain and/or the stress. For example, the first signal may be indicative of the strain and/or the stress meeting the threshold strain level and/or the threshold stress level and/or a duration of time that the strain and/or the stress meets the threshold strain level and/or the threshold stress level. For example, a time during which the first object is used, misused, interacted with, held, etc. and/or during which a force is applied to the first object may be determined based upon the duration of time that the strain and/or the stress meets the threshold strain level and/or the threshold stress level.

Alternatively and/or additionally, a set of signals may be received from the first device. Each signal of the set of signals may be indicative of the strain and/or the stress meeting the threshold strain level and/or the threshold stress level. For example, each signal of the set of signals may be indicative of a usage event corresponding to the first object being used, misused, interacted with and/or held. In some examples, the set of signals may correspond to a usage session where the first object is used, misused, interacted with and/or held. Alternatively and/or additionally, each signal of the set of signals may be associated with a time, of a set of times associated with the set of signals, associated with a usage event corresponding to the first object being used, misused, interacted with and/or held. In some examples, the duration of time that the strain and/or the stress meets the threshold strain level and/or the threshold stress level may be determined based upon the set of signals and/or the set of times. Alternatively and/or additionally, a time during which the first object is used, misused, interacted with and/or held may be determined based upon the duration of time that the strain and/or the stress meets the threshold strain level and/or the threshold stress level. Alternatively and/or additionally, the time during which the first object is used, misused, interacted with and/or held may be determined based upon the set of times (e.g., the time may correspond to a period of time between an initial time of the set of times to a last time of the set of times).

In some examples, the first status may be indicative of one or more of the duration of time that the strain and/or the stress meets the threshold strain level and/or the threshold stress level, the time during which the first object is used, misused, interacted with and/or held, etc. Alternatively and/or additionally, the first status may be indicative of an amount of damage sustained by the first object as a result of the first object being used and/or misused. For example, the amount of damage may be determined based upon the strain and/or the stress. For example, the first object may be damaged as a result of the strain and/or the stress meeting the threshold strain level and/or the threshold stress level. In some examples, the first object may sustain a first amount of damage as a result of the strain and/or the stress meeting the threshold strain level and/or the threshold stress level (e.g., the shovel may be fractured as a result of the strain and/or the stress meeting the threshold strain level and/or the threshold stress level). Alternatively and/or additionally, the first object may sustain a second amount of damage as a result of the strain and/or the stress meeting a second threshold strain level and/or a second threshold stress level (e.g., the shovel may break into multiple pieces as a result of the strain and/or the stress meeting the second threshold strain level and/or the second threshold stress level).

Alternatively and/or additionally, the first status may be indicative of a second predicted duration of time until the first object is no longer usable and/or requires repair for further use. For example, the first object may not be usable and/or may require repair if an amount of strain and/or stress on the first object (and/or if an amount of damage sustained by the first object) (over time) results in the first object not being able to be used effectively and/or safely. Alternatively and/or additionally, the second predicted duration of time may correspond to a duration of time until a part of the first object (e.g., a handle of the shovel, a part of the machinery, etc.) requires repair and/or needs to be replaced (e.g., replaced with a new handle and/or a new part).

In some examples, the second predicted duration of time may be determined based upon the first signal and/or one or more signals received from the first device prior to receiving the first signal from the first device. For example, usage information (e.g., a rate at which the first object is used, a rate at which strain, stress and/or damage is sustained by the first object and/or a rate at which force is applied to the first object) may be determined based upon the first signal and/or the one or more signals. The second predicted duration of time may be determined based upon the usage information.

Alternatively and/or additionally, the first status may be indicative of usage information, associated with the first object, determined based upon a plurality of usage events associated with the first object (and/or a plurality of signals received from the first device). For example, the usage information may correspond to one or more of an amount of time that the first object is moved, interacted with, played with and/or used during a period of time (e.g., during a day, during a week, during a month, etc.), an average amount of time that the first object is moved, interacted with, played with and/or used per duration of time (e.g., per day, per week, per month, etc.) averaged over multiple amounts of time associated with multiple periods of time, a distance covered by the first object during a period of time (e.g., during a day, during a week, during a month, etc.), an average distance covered by the first object per duration of time (e.g., per day, per week, per month, etc.) averaged over multiple distances associated with multiple periods of time, a quantity of usage sessions associated with the first object during a period of time (e.g., during a day, during a week, during a month, etc.), an average quantity of usage sessions associated with the first object per duration of time (e.g., per day, per week, per month, etc.) averaged over multiple quantities of usage sessions associated with multiple periods of time, a total amount of time that the first object is moved, interacted with, played with and/or used, a total distance covered by the first object, a total quantity of usage sessions associated with the first object, a plurality of times during which the first object is moved, interacted with, played with and/or used, an amount of strain sustained by the first object as a result of the first object being used and/or misused, an amount of stress sustained by the first object as a result of the first object being used and/or misused, an amount of damage sustained by the first object as a result of the first object being used and/or misused, the second predicted duration of time until the first object is no longer usable and/or requires repair, etc.

In some examples, a graphical user interface of a first client device may be controlled to display the first status associated with the first object. The first client device may be the same as the client device (that receives the first signal). Alternatively and/or additionally, the first client device may be different than the client device. In some examples, the first status may be displayed via an object status interface. In some examples, the first status may be associated with the object status system. In some examples, the object status system may determine that the first object is associated with the first client device and/or a user associated with the first client device (e.g., the user may be one or more of an owner of the first object, an individual of a group of individuals that uses the first object, a consumer of the first object, a purchaser of the first object, etc.). As used herein, a group of individuals may correspond to one or more of occupants (such as a family) of a home (e.g., a living area, an apartment unit, etc.), one or more individuals (e.g., workers) of a workplace (e.g., one or more of an office, a factory, a warehouse, a facility, etc.), etc.

In some examples, the object status system may determine that the first object is associated with the first client device and/or the user associated with the first client device based upon purchase information associated with the first object. For example, the first object may be purchased at a store and/or an online shopping system by the user and/or a second user (e.g., a different individual of the group of individuals that uses the first object). In some examples, a first object identification of the first object may be entered and/or recorded in order to record and/or facilitate purchase of the first object. For example, the first object identification may correspond to a barcode and/or a radio-frequency identification (RFID) tag of the first object which may be scanned. Alternatively and/or additionally, payment information may be entered and/or recorded in order to purchase the first object. In some examples, the payment information (e.g., one or more of credit card information, debit card information, etc.) may be associated with the first client device and/or a first user account associated with the first client device. Alternatively and/or additionally, the first object identification of the first object may be associated with the first object.

In some examples, a database of payment information may comprise a plurality of sets of payment information. A set of payment information of the plurality of sets of payment information may comprise an indication of a client device associated with the set of payment information and/or an indication of a user account associated with the set of payment information. The database payment information may be analyzed based upon the payment information to determine that the payment information is associated with the first client device and/or the first user account associated with the first client device. Alternatively and/or additionally, an object identification database may comprise a plurality of sets of object information. In some examples, a set of object information of the plurality of sets of object information may comprise an indication of a manufacturer of an object, a type of object of the object, a model of the object, an instance identifier of the object, an object identification associated with the object, etc. In some examples, the plurality of sets of object information may be analyzed based upon the first object identification to identify a first set of object information associated with the first object. In some examples, the first set of object information may be indicative of the first identifier of the first object (e.g., the first object identification and/or the instance identifier may correspond to the first identifier of the first object). Accordingly, it may be determined that the first object associated with the first identifier is associated with the first client device and/or the user associated with the first client device.

Alternatively and/or additionally, the object status system may determine that the first object is associated with the first client device and/or the user associated with the first client device based upon receiving the first object identification and/or the first identifier via the first client device. For example, the object status interface may display an identification interface corresponding to inputting the first object identification and/or the first identifier. For example, the first object identification and/or the first identifier may be entered via typing the first object identification and/or the first identifier into a text area (e.g., the first object identification and/or the first identifier may correspond to a set of characters (e.g., numbers and/or letters) printed on the first object and/or printed on a package of the first object). Alternatively and/or additionally, a camera of the first client device may be used to scan the barcode (and/or the first object identification) using the identification interface. The plurality of sets of object information of the object identification database may be analyzed to determined that the first object identification is associated with the first object and/or the first identifier associated with the first object. Accordingly, it may be determined that the first object associated with the first identifier is associated with the first client device and/or the user associated with the first client device.

Alternatively and/or additionally, the object status system may determine that the first object is associated with the first client device and/or the user associated with the first client device based upon receiving a signal from the first device associated with the first object. The signal may comprise the first identifier. In some examples, the signal may be received by the client device associated with the user account and/or the user (e.g., the first client device and/or a different client device). In some examples, it may be determined that the first object is associated with the first client device and/or the user based upon reception of the signal and/or based upon the first identifier. In some examples, receiving the signal via the client device may be indicative of the first device being within a defined distance (e.g., one or more of 15 feet, 30 feet, 50 feet, 100 feet, 200 feet, etc.) of the client device (e.g., the defined distance may be based upon a transmission power of the first device and/or a communication protocol used by the first device for transmission of the signal). Alternatively and/or additionally, the client device may transmit and/or relay the signal to the first client device and/or the server associated with the object status system. In some examples, the object status system may determine that the first object is associated with the first client device and/or the user associated with the first client device based upon the signal being received, transmitted and/or relayed by the client device associated with the first user account. In some examples, operations of the object status system may be performed by the first client device. Alternatively and/or additionally, operations of the object status system may be performed by the server associated with the object status system.

In some examples, responsive to determining that the first object is associated with the first client device and/or the user associated with the first client device, the first object may be included in a first set of objects (e.g., a set of one or more objects) associated with the first client device and/or the user associated with the first client device. For example, the first set of objects may be owned, purchased, used and/or consumed by the user and/or the group of individuals. In some examples, the first set of objects may be associated with a first set of statuses (e.g., a set of one or more statuses). For example, an object of the first set of objects may be associated with a status of the first set of statuses. In some examples, the first set of statuses may comprise the first status.

In some examples, the first set of statuses may be accessed and/or displayed via the object status interface. For example, a list of object statuses may be displayed via the object status interface. A list item of the list of object statuses may be indicative of an object of the first set of objects and/or a status, associated with the object, of the set of statuses.

Alternatively and/or additionally, the first set of statuses may comprise a set of product amount statuses and/or a set of object usage statuses. In some examples, a status of the set of product amount statuses may be indicative of one or more of an amount of product stored inside an object of the first set of objects, a predicted duration of time until product of the object is finished (e.g., completely depleted), a rate of depletion of product of the object, etc. In some examples, the set of product amount statuses may be accessed and/or displayed via the object status interface. For example, a list of product amount statuses may be displayed via the object status interface. A list item of the list of product amount statuses may be indicative of an object of the first set of objects and/or a status, associated with the object, of the set of product amount statuses.

In some examples, a status of the set of object usage statuses may be indicative of one or more of an amount of time that an object of the first set of objects is interacted with (e.g., used, held, played with, moved, etc.) during a period of time (e.g., during a day, during a week, during a month, etc.), an average amount of time that the object is interacted with per duration of time (e.g., per day, per week, per month, etc.) averaged over multiple amounts of time associated with multiple periods of time, a quantity of usage sessions associated with the object during a period of time (e.g., during a day, during a week, during a month, etc.), an average quantity of usage sessions associated with the object per duration of time (e.g., per day, per week, per month, etc.) averaged over multiple quantities of usage sessions associated with multiple periods of time, a distance covered by the object during a period of time (e.g., during a day, during a week, during a month, etc.), an average distance covered by the object per duration of time (e.g., per day, per week, per month, etc.) averaged over multiple distances associated with multiple periods of time, a total distance covered by the object, a total amount of time that the object is interacted with, a total quantity of usage sessions associated with the object, a plurality of times during which the object is interacted with, an amount of damage sustained by the object as a result of the object being used and/or misused, an amount of strain sustained by the object as a result of the object being used and/or misused, an amount of stress sustained by the object as a result of the object being used and/or misused, a predicted duration of time until the object is no longer usable and/or requires repair for further use, a predicted duration of time until a part of the object (e.g., a handle of the shovel, a component of a machine, etc.) requires repair and/or needs to be replaced, a state of charge of a battery of the object (e.g., a device coupled to the object may detect and/or measure the state of charge of the battery and/or a signal indicative of the state of charge may be received from the device), a predicted duration of time until the battery of the object needs to be replaced and/or charged, etc. In some examples, the set of object usage statuses may be accessed and/or displayed via the object status interface. For example, a list of object usage statuses may be displayed via the object status interface. A list item of the list of object usage statuses may be indicative of an object of the first set of objects and/or a status, associated with the object, of the set of object usage statuses.

FIGS. 5A-5E illustrate examples of a system 501 for determining statuses of objects using sensors. FIG. 5A illustrates devices coupled to the first set of objects transmitting signals to a client device 538. In some examples, the first set of objects may comprise a shampoo container 502 coupled to a first device 504, a body wash container 506 coupled to a second device 508, a soap container 510 coupled to a third device 512, a lotion container 514 coupled to a fourth device 516, a book 518 coupled to a fifth device 520, a pill container 522 coupled to a sixth device 524, a milk container 526 coupled to a seventh device 528, a box of cereal 530 coupled to an eighth device 532, a baseball bat 534 coupled to a ninth device 536 and/or a shovel 540 coupled to a tenth device 542.

In some examples, a plurality of devices comprising the first device 504, the second device 508, the third device 512, the fourth device 516, the fifth device 520, the sixth device 524, the seventh device 528, the eighth device 532, the ninth device 536 and/or the tenth device 542 may transmit a plurality of signals to the client device 538. In some examples, the client device 538 may correspond to one or more of a computer, a smartphone, a smart speaker, a smart TV, a laptop, a router, a modem and/or a different device capable of performing wireless communication. In some examples, the client device 538 may receive the plurality of signals from the plurality of devices. In some examples, the client device 538 may determine the first set of statuses associated with the first set of objects based upon the plurality of signals. Alternatively and/or additionally, the client device 538 may relay the plurality of signals to a second client device 500 (illustrated in FIG. 5B) and/or to a server associated with the object status system. In some examples, the first set of statuses associated with the first set of objects may be determined by the second client device 500 and/or by the object status system based upon the plurality of signals.

Figure 5B:
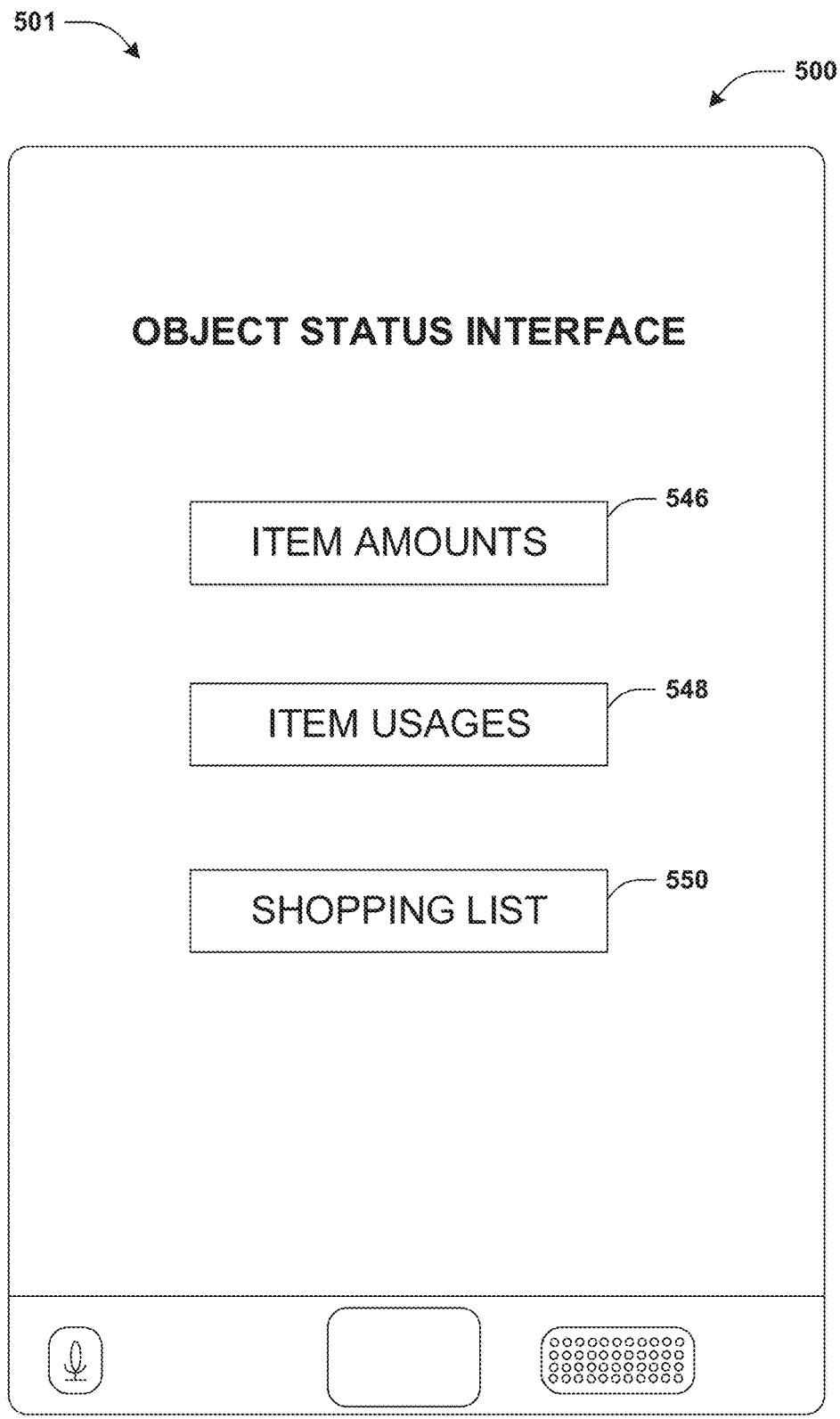
FIG. 5B is a component block diagram illustrating an example system for determining statuses of objects using sensors, where an object status interface is displayed by a second client device.

FIG. 5B illustrates the object status interface being displayed by the second client device 500. In some examples, the object status interface may comprise a first selectable input 546 "ITEM AMOUNTS" associated with the list of product amount statuses associated with objects of the first set of objects. Alternatively and/or additionally, the object status interface may comprise a second selectable input 548 "ITEM USAGES" associated with the list of object usage statuses associated with objects of the first set of objects. Alternatively and/or additionally, the object status interface may comprise a third selectable input 550 "SHOPPING LIST" associated with a shopping list associated with objects of the first set of objects.

Figure 5C:
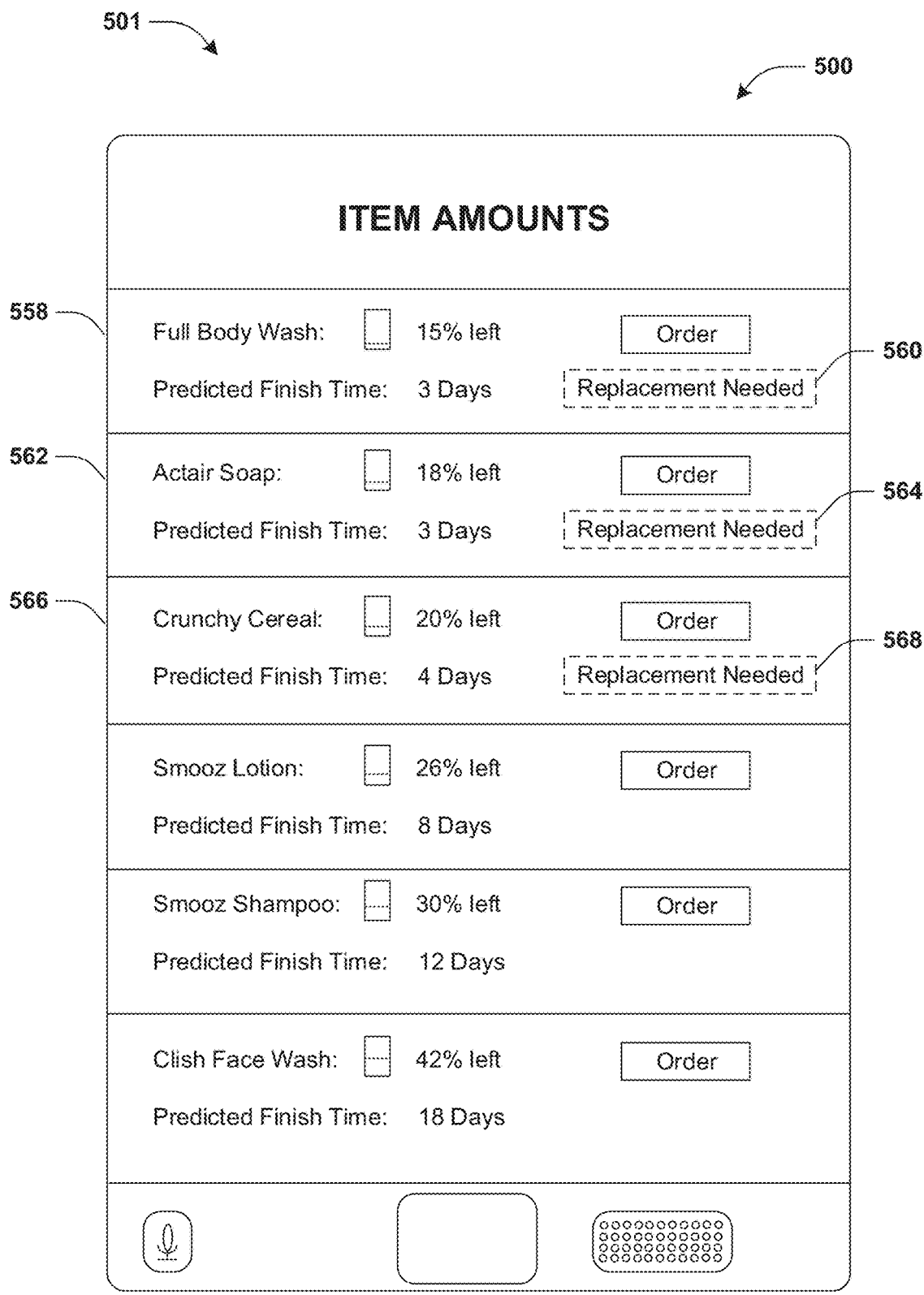
FIG. 5C is a component block diagram illustrating an example system for determining statuses of objects using sensors, where an object status interface displays a list of product amount statuses.

FIG. 5C illustrates the object status interface displaying the list of product amount statuses. In some examples, the list of product amount statuses may be displayed responsive to a selection of the first selectable input 546. In some examples, a list item of the list of product amount statuses may be indicative of an object (of the set of objects) associated with the list item. Alternatively and/or additionally, a list item of the list of product amount statuses may be indicative of an amount of product stored inside of an object associated with the list item. Alternatively and/or additionally, a list item of the list of product amount statuses may be indicative of a predicted duration of time until product of an object associated with the list item is finished (e.g., completely depleted). Alternatively and/or additionally, a list item of the list of product amount statuses may comprise a selectable input associated with purchasing a shopping item corresponding to an object associated with the list item. In some examples, the list of product amount statuses may be arranged and/or organized in an increasing (and/or a decreasing) order of amounts of product stored inside objects and/or in an increasing (and/or a decreasing) order of predicted durations of time until product of objects are finished.

In some examples, a first list item 558 of the list of product amount statuses may be indicative of a first status associated with the body wash container 506. In some examples, the first status may be determined based upon one or more signals received from the second device 508 coupled to the body wash container 506. In some examples, the first status may be indicative of an amount of body wash stored inside the body wash container 506 (e.g., 15% of an initial amount of body wash of the body wash container 506) and/or a predicted duration of time until body wash of the body wash container 506 is finished (e.g., completely depleted).

Alternatively and/or additionally, the first list item 558 may comprise an indication 560 that that the user and/or the group of individuals should purchase a replacement body wash container. For example, the amount of body wash may be compared with a threshold amount of body wash. In some examples, the indication 560 may be displayed based upon a determination that the amount of body wash is less than the threshold amount of body wash (e.g., the threshold amount of body wash may correspond to 25% of the initial amount of body wash). Alternatively and/or additionally, the predicted duration of time until body wash of the body wash container 506 is finished may be compared with a first threshold duration of time. In some examples, the indication 560 may be displayed based upon a determination that the predicted duration of time until body wash of the body wash container 506 is finished is less than the first threshold duration of time (e.g., the first threshold duration of time may correspond to 5 days).

Alternatively and/or additionally, responsive to determining that the amount of body wash is less than the threshold amount of body wash and/or that the predicted duration of time until body wash of the body wash container 506 is finished is less than the first threshold duration of time, a notification may be transmitted to the second client device 500 and/or the notification may be displayed via the second client device 500. For example, the notification may indicate that the user and/or the group of individuals should purchase a replacement body wash container. Alternatively and/or additionally, the notification may comprise a selectable input associated with purchasing a shopping item corresponding to the body wash container 506 (e.g., purchasing a second body wash container).

Alternatively and/or additionally, a second list item 562 of the list of product amount statuses may be indicative of a second status associated with the soap container 510. In some examples, the second status may be determined based upon one or more signals received from the third device 512 coupled to the soap container 510. In some examples, the second status may be indicative of an amount of soap stored inside the soap container 510 (e.g., 18% of an initial amount of soap of the soap container 510) and/or a predicted duration of time until soap of the soap container 510 is finished (e.g., completely depleted).

Alternatively and/or additionally, the second list item 562 may comprise an indication 564 that the user and/or the group of individuals should purchase a replacement body wash container. For example, the amount of soap may be compared with a threshold amount of soap. In some examples, the indication 564 may be displayed based upon a determination that the amount of soap is less than the threshold amount of soap. Alternatively and/or additionally, the predicted duration of time until soap of the soap container 510 is finished may be compared with a second threshold duration of time. In some examples, the indication 564 may be displayed based upon a determination that the predicted duration of time until soap of the soap container 510 is finished is less than the second threshold duration of time.

Alternatively and/or additionally, responsive to determining that the amount of soap is less than the threshold amount of soap and/or that the predicted duration of time until soap of the soap container 510 is finished is less than the second threshold duration of time, a notification may be transmitted to the second client device 500 and/or the notification may be displayed via the second client device 500. For example, the notification may indicate that the user and/or the group of individuals should purchase a replacement soap container. Alternatively and/or additionally, the notification may comprise a selectable input associated with purchasing a shopping item corresponding to the soap container 510 (e.g., purchasing a second soap container).

Alternatively and/or additionally, a third list item 566 of the list of product amount statuses may be indicative of a third status associated with the box of cereal 530. In some examples, the third status may be determined based upon one or more signals received from the eighth device 532 coupled to the box of cereal 530. In some examples, the third status may be indicative of an amount of cereal stored inside the box of cereal 530 (e.g., 20% of an initial amount of cereal of the box of cereal 530) and/or a predicted duration of time until cereal of the box of cereal 530 is finished (e.g., completely depleted).

Alternatively and/or additionally, the third list item 566 may comprise an indication 568 that the user and/or the group of individuals should purchase a replacement box of cereal. For example, the amount of cereal may be compared with the threshold amount of cereal. In some examples, the indication 568 may be displayed based upon a determination that the amount of cereal is less than the threshold amount of cereal. Alternatively and/or additionally, the predicted duration of time until cereal of the box of cereal 530 is finished may be compared with a third threshold duration of time. In some examples, the indication 568 may be displayed based upon a determination that the predicted duration of time until cereal of the box of cereal 530 is less than the third threshold duration of time.

Alternatively and/or additionally, responsive to determining that the amount of cereal is less than the threshold amount of cereal and/or that the predicted duration of time until cereal of the box of cereal 530 is less than the third threshold duration of time, a notification may be transmitted to the second client device 500 and/or the notification may be displayed via the second client device 500. Alternatively and/or additionally, the notification may comprise a selectable input associated with purchasing a shopping item corresponding to the box of cereal 530 (e.g., purchasing a second box of cereal).

In some examples, responsive to determining that the amount of body wash is less than the threshold amount of body wash and/or that the predicted duration of time until body wash of the body wash container 506 is finished is less than the first threshold duration of time, an indication of the body wash container 506 may be stored in a shopping list. Alternatively and/or additionally, responsive to determining that the amount of soap is less than the threshold amount of soap and/or that the predicted duration of time until soap of the soap container 510 is finished is less than the second threshold duration of time, an indication of the soap container 510 may be stored in the shopping list. Alternatively and/or additionally, responsive to determining that the amount of cereal is less than the threshold amount of cereal and/or that the predicted duration of time until cereal of the box of cereal 530 is less than the third threshold duration of time, an indication of the box of cereal 530 may be stored in the shopping list.

In some examples, one or more shopping databases may be analyzed based upon identifiers associated with the body wash container 506, the soap container 510 and/or the box of cereal 530 to identify shopping items corresponding to the body wash container 506, the soap container 510 and/or the box of cereal 530. In some examples, the one or more shopping databases may be associated with an online shopping system. For example, the one or more shopping databases may comprise information associated with a plurality of shopping items sold by one or more entities via the online shopping system. For example, the one or more shopping databases may be analyzed based upon object information associated with the body wash container 506, the soap container 510 and/or the box of cereal 530 to identify the shopping items. In some examples, the shopping items may comprise a first shopping item 588 (illustrated in FIG. 5D) corresponding to the body wash container 506, a second shopping item 596 (illustrated in FIG. 5D) corresponding to the soap container 510 and/or a third shopping item 598 (illustrated in FIG. 5D) corresponding to the box of cereal 530. For example, the one or more shopping databases may be analyzed based upon one or more of a manufacturer of the body wash container 506, a model of the body wash container 506, an identifier of the body wash container 506, etc. to identify the first shopping item 588. For example, the first shopping item 588 may be the same as and/or similar to the soap container 510.

Figure 5D:
FIG. 5D is a component block diagram illustrating an example system for determining statuses of objects using sensors, where a second client device displays a shopping interface.

FIG. 5D illustrates the second client device 500 displaying a shopping interface. In some examples, the shopping interface may be displayed responsive to a selection of the third selectable input 550. In some examples, the shopping interface may comprise indications of the shopping items (e.g., the first shopping item 588, the second shopping item 596 and/or the third shopping item 598). In some examples, the shopping items may be included in a shopping cart associated with the second client device 500. Alternatively and/or additionally, the shopping interface may comprise indications of prices associated with the shopping items, shipping costs associated with delivering the shopping items to a location of the user and/or the group of individuals and/or a total price of the shopping items and the shipping costs. Alternatively and/or additionally, the shopping interface may comprise a fourth selectable input 594 "Order" corresponding to purchasing the shopping items. For example, responsive to a selection of the fourth selectable input 594, the shopping items may be purchased using payment information associated with the user (and/or the group of individuals) and/or the second client device 500. For example, the payment information may be determined based upon previous purchases and/or the payment information may be input via a payment interface (e.g., the payment interface may be displayed responsive to the selection of the fourth selectable input 594).

Alternatively and/or additionally, the shopping interface may comprise a fifth selectable input 590 "Add More Items" corresponding to adding one or more shopping items to the shopping items and/or to the shopping cart. In some examples, responsive to a selection of the fifth selectable input 590, an online shopping interface associated with the online shopping system may be displayed. For example, the one or more shopping items may be selected from the plurality of shopping items via the online shopping interface. For example, responsive to selecting the one or more shopping items, the one or more shopping items may be included in the shopping items and/or in the shopping cart.

Alternatively and/or additionally, the shopping interface may comprise a sixth selectable input 592 "Automatically Add Items for Free Shipping" corresponding to automatically adding one or more shopping items to the shopping items and/or to the shopping cart such that a price of the shopping items and/or the shopping cart exceeds a minimum price required for free shipping. In some examples, responsive to a selection of the sixth selectable input 592, the one or more shopping items may be automatically selected and/or added to the shopping items and/or to the shopping cart such that the price exceeds the minimum price required for free shipping. In some examples, the one or more shopping items may correspond to one or more objects of the first set of objects (e.g., one or more of the lotion container 514, the shampoo container 502, etc.).

In some examples, automatic purchases of shopping items corresponding to objects with amounts of product less than threshold amounts of product may be enabled. For example, one or more user settings associated with the object status system may be input via the object status interface. In some examples, the one or more user settings may correspond to enabling automatic purchases of shopping items associated with objects with amounts of product less than threshold amounts of product. For example, if automatic purchase of shopping items is enabled, responsive to determining that an amount of product of an object is less than a threshold amount of product, a shopping item corresponding to the object may be selected and/or purchased (automatically) using stored payment information associated with the second client device 500 and/or the user (without receiving a selection of the fourth selectable input 594, for example). Alternatively and/or additionally, responsive to determining that objects, meeting a threshold quantity of objects, are associated with amounts of product less than threshold amounts of product, shopping items associated with the objects may be selected and/or purchased (automatically) using stored payment information associated with the second client device 500 and/or the user (without receiving a selection of the fourth selectable input 594, for example). Alternatively and/or additionally, responsive to determining that the shopping list comprises shopping items corresponding to objects with amounts of product less than threshold amounts of product and/or that a price of the shopping items exceeds the minimum price required for free shipping, the shopping items may be purchased (automatically) using stored payment information associated with the second client device 500 and/or the user (without receiving a selection of the fourth selectable input 594, for example).

In some examples, one or more shopping stores may be identified based upon a location associated with the second client device 500 and/or the user (and/or the group of individuals). For example, a plurality of shopping store listings may be analyzed to identify the one or more shopping stores that are within a threshold distance of the location. In some examples, one or more shopping databases (e.g., store catalogs) associated with the one or more shopping stores may be analyzed based upon identifiers associated with the body wash container 506, the soap container 510 and/or the box of cereal 530 to identify shopping items corresponding to the body wash container 506, the soap container 510 and/or the box of cereal 530. In some examples, one or more shopping items provided by and/or sold by a first shopping store of the one or more shopping stores may be identified. For example, the one or more shopping items may comprise a fourth shopping item corresponding to the body wash container 506, a fifth shopping item corresponding to the soap container 510 and/or a sixth shopping item corresponding to the box of cereal 530. In some examples, the shopping interface may display an indication of the first shopping store (e.g., a name of the first shopping store), an indication of the one or more shopping items, an address of the first shopping store and/or a seventh selectable input corresponding to providing navigational directions to the first shopping store. For example, responsive to a selection of the seventh selectable input, a navigational interface may be displayed using the second client device 500. The navigational interface may provide directions (e.g., turn by turn directions) to the first shopping store.

In some examples, rates of depletion of product of objects of the set of objects may be monitored. For example, a first exemplary rate of depletion of product of a first exemplary object (e.g., a toothpaste container) may be monitored. In some examples, the first exemplary rate of depletion of product may correspond to an average amount of product (e.g., toothpaste) depleted per duration of time (e.g., per day, per week, per month, etc.). In some examples, responsive to detecting a change of the first exemplary rate of depletion of product, a notification, indicative of the change in the first exemplary rate of depletion of product, may be transmitted to the second client device 500 and/or the notification may be displayed via the object status interface.

For example, the change of the first exemplary rate of depletion of product may correspond to an increase of the first exemplary rate of depletion of product. For example, an average amount of product depleted per day during one or more first days (e.g., a current day and/or one or more days prior to the current day) may be greater than an average amount of product depleted per day during one or more second days prior to the one or more first days. For example, the increase of the first exemplary rate of depletion of product may be an indicator of misuse of the first exemplary object (e.g., toothpaste is misused by one or more individuals of the group of individuals).

Alternatively and/or additionally, the change of the first exemplary rate of depletion of product may correspond to a decrease of the first exemplary rate of depletion of product. For example, an average amount of product depleted per day during the one or more first days (e.g., the current day and/or the one or more days prior to the current day) may be less than an average amount of product depleted per day during the one or more second days prior to the one or more first days. For example, the decrease of the first exemplary rate of depletion of product may be an indicator of misuse of the first exemplary object (e.g., toothpaste is not used sufficiently in order to maintain healthy teeth by one or more individuals of the group of individuals).

Figure 5E:
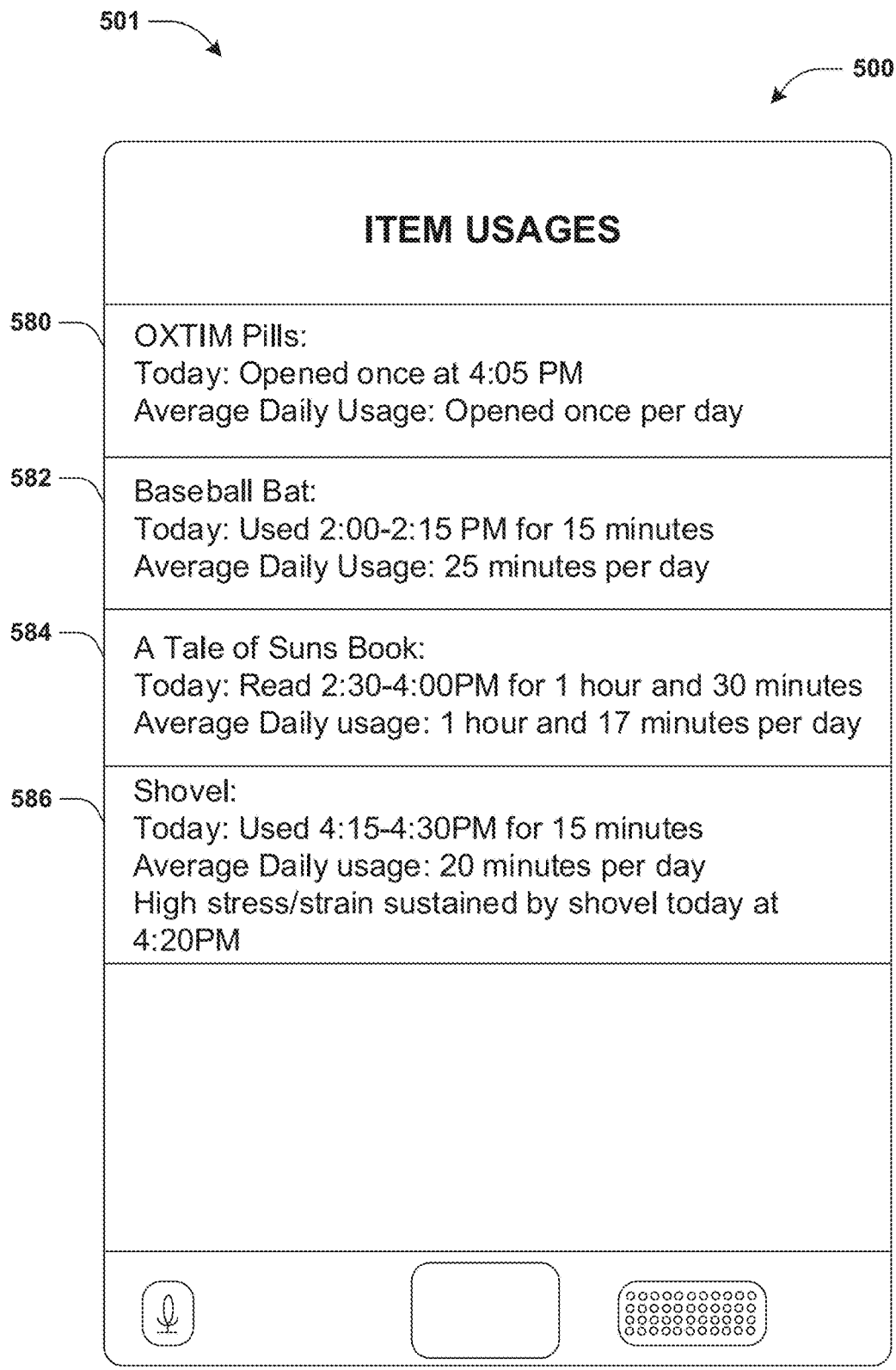
FIG. 5E is a component block diagram illustrating an example system for determining statuses of objects using sensors, where a second client device displays a list of object usage statuses.

FIG. 5E illustrates the second client device 500 displaying the list of object usage statuses. In some examples, a list item of the list of object usage statuses may be indicative of an object (of the set of objects) associated with the list item. Alternatively and/or additionally, a list item of the list of object usage statuses may be indicative of an amount of time that an object associated with the list item is interacted with (e.g., used, held, played with, read, moved, etc.) during a period of time (e.g., during the current day). Alternatively and/or additionally, a list item of the list of object usage statuses may be indicative of a quantity of usage sessions associated with an object associated with the list item during a period of time (e.g., during the current day). Alternatively and/or additionally, a list item of the list of object usage statuses may be indicative of an average quantity of usage sessions associated with an object associated with the list item per duration of time (e.g., per day) averaged over multiple quantities of usage sessions associated with multiple periods of time (e.g., multiple days). Alternatively and/or additionally, a list item of the list of object usage statuses may be indicative of a time (e.g., a time of day) during which an object associated with the list item is interacted with during a period of time (e.g., during the current day). Alternatively and/or additionally, a list item of the list of object usage statuses may be indicative of an average amount of time that an object associated with the list item is interacted with per duration of time (e.g., per day) averaged over multiple amounts of time associated with multiple periods of time (e.g., multiple days). Alternatively and/or additionally, a list item of the list of object usage statuses may be indicative of an amount of strain and/or an amount of stress sustained by an object as a result of the object being used and/or misused and/or a time at which the amount of strain and/or the amount of stress is sustained by the object.

In some examples, a first list item 580 of the list of object usage statuses may be indicative of a fourth status associated with the pill container 522. In some examples, the fourth status may be determined based upon one or more signals received from the sixth device 524 coupled to the pill container 522. In some examples, the fourth status may be indicative of a quantity of usage sessions associated with the pill container 522 during the current day (e.g., the fourth status may be indicative of one usage session (where the pill container 522 is opened) during the current day). Alternatively and/or additionally, the fourth status may be indicative of a time associated with the one usage session. Alternatively and/or additionally, the fourth status may be indicative of an average quantity of usage sessions associated with the pill container 522 per day (e.g., one usage session per day).

In some examples, a second list item 582 of the list of object usage statuses may be indicative of a fifth status associated with the baseball bat 534. In some examples, the fifth status may be determined based upon one or more signals received from the ninth device 536 coupled to the baseball bat 534. In some examples, the fifth status may be indicative of an amount of time during which the baseball bat 534 is interacted with during the current day (e.g., 15 minutes). Alternatively and/or additionally, the fifth status may be indicative of a time during which the baseball bat 534 is interacted with during the current day (e.g., 2:00-2:15 PM). Alternatively and/or additionally, the fifth status may be indicative of an average amount of time that the baseball bat 534 is interacted with per day (e.g., 25 minutes per day).

In some examples, a third list item 584 of the list of object usage statuses may be indicative of a sixth status associated with the book 518. In some examples, the sixth status may be determined based upon one or more signals received from the fifth device 520 coupled to the book 518. In some examples, the sixth status may be indicative of an amount of time during which the book 518 is interacted with (e.g., read) during the current day (e.g., 1 hour and 30 minutes). Alternatively and/or additionally, the sixth status may be indicative of a time during which the book 518 is interacted with during the current day (e.g., 2:30-4:00 PM). Alternatively and/or additionally, the sixth status may be indicative of an average amount of time that the book 518 is interacted with per day (e.g., 1 hour and 17 minutes per day).

In some examples, a fourth list item 586 of the list of object usage statuses may be indicative of a seventh status associated with the shovel 540. In some examples, the seventh status may be determined based upon one or more signals received from the tenth device 542 coupled to the shovel 540. In some examples, the seventh status may be indicative of an amount of time during which the shovel 540 is used during the current day (e.g., 15 minutes). Alternatively and/or additionally, the seventh status may be indicative of a time during which the shovel 540 is used during the current day (e.g., 4:15-4:30 PM). Alternatively and/or additionally, the seventh status may be indicative of an average amount of time that the shovel 540 is used per day (e.g., 20 minutes per day). Alternatively and/or additionally, the seventh status may be indicative of an amount of stress and/or an amount of strain sustained by the shovel 540 (e.g., the shovel 540 sustained a high level of stress and/or strain). Alternatively and/or additionally, the seventh status may be indicative of a time at which the amount of stress and/or the amount of strain are sustained by the shovel 540 (e.g., 4:20 PM during the current day).

In some examples, the object status system and/or the object status interface may be used by the user to determine usage behavior of individuals with the set of objects. For example, the user may determine, using the object status interface, whether the book 518 is read and/or the baseball bat 534 is used and/or played with (by an individual of the group of individuals, such as a child of a household) and/or how long the book 518 is read and/or the baseball bat 534 is used and/or played with.

Alternatively and/or additionally, the object status system and/or the object status interface may be used by the user to determine whether an object is used and/or misused, an amount of time that the object is used, an amount of stress and/or strain sustained by the object, an amount of damage sustained by the object, a predicted duration of time until the object is unusable and/or requires repair, etc. In some examples, the object status system and/or the object status interface may automatically display a notification responsive to detecting an amount of stress and/or an amount of strain sustained by the object that exceed a threshold amount of stress and/or a threshold amount of strain. For example, the notification may be indicative of the object sustaining the amount of stress and/or the amount of strain that exceed the threshold amount of stress and/or the threshold amount of strain. Alternatively and/or additionally, the notification may be indicative of the object sustaining damage. In some examples, the notification may be transmitted to the second client device 500 and/or displayed via the second client device 500.

In an example, the user may be associated with a business (e.g., a hardware rental business, a warehouse, a factory, etc.). The set of objects may correspond to tools and/or machinery (and/or other objects) associated with the business. For example, the user may use the object status system and/or the object status interface to determine one or more of whether objects of the set of objects are being used, amounts of time that the objects are being used, amounts of stress and/or strain sustained by the objects, amounts of damage sustained by the objects, predicted durations of time until the objects are unusable and/or require repair, etc. Alternatively and/or additionally, the object status system and/or the object status interface may identify one or more objects of the set of objects that are being misused (e.g., the one or more objects may be determined based upon amounts of damage, stress and/or strain sustained by the one or more objects). Alternatively and/or additionally, the object status system and/or the object status interface may identify one or more objects of the set of objects that will be unusable and/or will require repair within a threshold duration of time from a current time. Accordingly, the business may plan on either purchasing an object of the one or more objects and/or repairing the object (e.g., replacing a part of the object). In an example where the business is a hardware rental business, the business may use the object status system and/or the object status interface to determine whether a renter misused an object and/or caused damage to the object. In the example, the business may require compensation from the renter based upon the damage caused to the object. In another example where the business is associated with a factory, the business may determine whether an object is misused and/or sustains damage. In the example the business may train workers such that the workers do not continue to misuse the object.

Alternatively and/or additionally, the user may determine, using the object status interface, whether medication of a medicine container (e.g., pills of the pill container 522) is used correctly, such as whether the medication is used as directed by a physician. For example, the user (and/or a different user, such as a different individual of the group of individuals) may forget whether they opened the medicine container and/or consumed a dosage of medication of the medicine container. The user may access the list of object usage statuses in order to determine whether the medicine container was used during the current day (and/or a different day) and/or at what time the medicine container was used during the current day.

Alternatively and/or additionally, the object status interface may display one or more of an amount of medication stored inside the medicine container (e.g., a quantity of pills stored inside the pill container 522), a predicted duration of time until medication of the medicine container is finished (e.g., completely depleted), a rate of depletion of medication of the medicine container (e.g., an average quantity of pills depleted and/or consumed per duration of time (e.g., per day, per week, etc.) and/or an average of amount of medication depleted and/or consumed per duration of time), etc. For example, a list item of the list of product amount statuses may be indicative of one or more of the amount of medication stored inside the medicine container, the predicted duration of time until medication of the medicine container is finished, the rate of depletion of medication of the medicine container, etc. The user (and/or one or more of a physician, a pharmacist, a technician, etc. with access to one or more of the amount of medication stored inside the medicine container, the predicted duration of time until medication of the medicine container is finished, the rate of depletion of medication of the medicine container, etc.) may determine whether medication of the medicine container is used correctly based upon one or more of the amount of medication stored inside the medicine container, the predicted duration of time until medication of the medicine container is finished, the rate of depletion of medication of the medicine container, etc.

In some examples, usage of the medicine container may be monitored and/or analyzed based upon medication usage information associated with the medicine container. For example, the medication usage information may correspond to a plan of care for a patient (e.g., such as the user and/or an individual of the group of individuals). For example, the medication usage information may correspond to a dosage of medication (e.g., a quantity of pills and/or an amount of the medication to be taken at a single time), a quantity of dosages per duration of time (e.g., per day) that the patient is directed to consume, one or more times (e.g., one or more times of day) that one or more dosages are to be consumed, etc. In some examples, the medication usage information may be input via the object status interface. Alternatively and/or additionally, a picture of a prescription comprising printed instructions for use of the medicine container and/or a picture of the medicine container comprising printed instructions for use of the medicine container may be taken using a camera of the second client device 500. In some examples, the picture may be analyzed to determine the medication usage information.

In some examples, responsive to a determination that the rate of depletion of medication is different than a directed rate of depletion of medication, a notification that pills are being misused and/or incorrectly consumed may be transmitted to the second client device 500 and/or may be displayed via the object status interface (e.g., the directed rate of depletion of medication may be determined based upon the dosage of medication and/or the quantity of dosages per duration of time (e.g., per day) that the patient is directed to consume). Alternatively and/or additionally, responsive to a determination that the medicine container was not used at a time of the one or more times that a dosage is to be consumed and/or that a dosage of the medicine container was not consumed at the time, a notification reminding the user (and/or the patient) to consume a pill of the medicine container may be transmitted to the second client device 500 and/or may be displayed via the object status interface.

In some examples, the object status system may receive a recall notification indicative of a product recall associated with one or more recalled objects (e.g., a manufacturer and/or seller of the one or more recalled objects may request that the one or more recalled objects are returned due to safety issues and/or product defects that may endanger consumers of the one or more recalled objects). In some examples, the notification may be indicative of one or more of one or more manufacturers of the one or more recalled objects, one or more models of the one or more recalled objects, one or more identifiers of the one or more recalled objects, etc. In some examples, one or more of the one or more manufacturers of the one or more recalled objects, the one or more models of the one or more recalled objects, the one or more identifiers of the one or more recalled objects, etc. may be compared with object information associated with the set of objects to determine whether an object of the set of objects matches a recalled object of the one or more recalled objects. For example, responsive to determining that an exemplary object of the set of objects matches a recalled object of the one or more recalled objects, a notification, indicative of the exemplary object being recalled, may be transmitted to the second client device 500. Alternatively and/or additionally, the notification may be displayed via the second client device 500 and/or via the object status interface.

In some examples, a first location of the user and/or the second client device 500 may be determined using the object status system. For example, an object location of one or more exemplary objects of the first set of objects may be determined. For example, it may be determined that the one or more exemplary objects are located at one or more of a home, a workplace, etc. of the user. In some examples, it may be determined, based upon one or more signals transmitted by one or more exemplary devices coupled to the one or more exemplary objects, that the one or more exemplary objects are interacted with and/or used during a period of time. In some examples, a probability that the user and/or the second client device 500 are at the object location of the one or more exemplary objects during the period of time may be determined. For example, the probability that the user and/or the second client device 500 are at the object location of the one or more exemplary objects may correspond to a probability that the user interacted with the one or more exemplary objects during the period of time (e.g., a probability that the one or more signals are transmitted based upon interactions that the user, and not a different individual, had with the one or more exemplary objects). In some examples, the probability that the user interacted with the one or more exemplary objects during the period of time may be determined based upon a quantity of individuals of the group of individuals (e.g., a quantity of members of a household of the home). In some examples, it may be determined that the first location of the user and/or the second client device 500 corresponds to the object location of the one or more exemplary objects responsive to a determination that the probability that the user and/or the second client device 500 are at the object location of the one or more exemplary objects exceeds a threshold probability.

In some examples, the object status system may be associated with a content system. In some examples, the content system may be an advertisement system. Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, an exemplary user may be required to watch and/or interact with the content item before the exemplary user can access content of a web page, utilize resources of an application and/or play a game.

In some examples, the content system may select one or more content items for presentation via the second client device 500 based upon the first set of statuses associated with the first set of objects. For example, responsive to a determination that the amount of body wash stored inside the body wash container 506 is less than a threshold amount of body wash and/or that the predicted duration of time until body wash of the body wash container 506 is finished is less than a threshold duration of time, a content item associated with one or more body wash shopping items may be selected for presentation via the second client device 500. Alternatively and/or additionally, it may be determined that the user is interested in a type of shopping item corresponding to an exemplary object of the first set of objects based upon a determination that a rate of depletion of product of the exemplary object exceeds a threshold rate of depletion of product and/or a determination that a rate at which the exemplary object is used and/or interacted with exceeds a threshold rate. In some examples, responsive to determining that the user is interested in the type of shopping item, a content item associated with the type of shopping item may be selected for presentation via the second client device 500.

In some examples, information associated with usage of the first set of objects may be shared with one or more systems associated with one or more entities. For example, the information may be generated based upon the first set of statuses. In some examples, the information may not include user identification information (e.g., a name of the user). Alternatively and/or additionally, the information may be indicative of one or more of a region (e.g., one or more of a city, a zip code, a state, a country, etc.) associated with the user and/or the group of individuals, a time of year associated with the information, a quantity of individuals of the group of individuals (e.g., a household size associated with the household, a quantity of workers of a business and/or an enterprise that work at the workplace, etc.) which may be received and/or determined via the object status interface, etc. In some examples, the information may be combined with a plurality of sets of information associated with usage of objects by other users and/or other groups of individuals (e.g., other households, other workplaces associated with enterprises and/or businesses, etc.) to generate a set of aggregate object usage information. In some examples, the set of aggregate object usage information may be indicative of one or more of an average rate of depletion of product of an object by quantity of individuals of a group of individuals (e.g., household size and/or workplace size), time of the year (e.g., a season, such as summer and/or a month, such as July), region (e.g., one or more of city, zip code, state, country, etc.), etc. Alternatively and/or additionally, an average amount of time that the object is used per duration of time by quantity of individuals of a group of individuals (e.g., household size and/or workplace size), time of the year, region, etc. In some examples, an entity of the one or more entities (e.g., a manufacturer of the object) may determine, based upon the set of aggregate object usage information, one or more times of the year where the object more frequently used, regions where the object is more frequently used, etc. Alternatively and/or additionally, the entity may decide, based upon the set of aggregate object usage information, where and/or when to focus advertisement campaigns in order to increase consumption and/or usage of the object (and/or one or more other objects associated with the entity).

It may be appreciated that the disclosed subject matter may assist a user and/or a business and/or an enterprise associated with the user (and/or a client device associated with the user) in keeping track of statuses associated with objects associated with the user.

For example, the user may be automatically notified of one or more objects that are close to being depleted. Alternatively and/or additionally, amounts of product associated with objects may be determined automatically and/or compared with threshold amounts of product to automatically identify the one or more objects that are close to being depleted. Alternatively and/or additionally, predicted durations of time until the objects are finished may be determined automatically and/or compared with threshold durations of time to automatically identify the one or more objects that are close to being depleted. Alternatively and/or additionally, one or more shopping items corresponding to the one or more objects may be determined automatically and/or displayed via a shopping interface, allowing the user to conveniently purchase the one or more shopping items without searching for the shopping items. Alternatively and/or additionally, the one or more shopping items may be automatically purchased such that the user receives the one or more shopping items prior to the one or more objects being finished and/or completely depleted. Accordingly, the user may not need to manually check the objects to determine amounts of product stored inside the objects and/or predict durations of time until product of the objects are finished.

Alternatively and/or additionally, the user may be automatically notified of one or more objects (that may have safety issues) that are recalled (by a manufacturer), reducing a risk of the user consuming and/or using the one or more objects that may endanger the user.

Alternatively and/or additionally, the user may be reminded to take medication and/or may be notified if medication is taken incorrectly.

Alternatively and/or additionally, the user may use statuses associated with objects to determine usage behavior, of one or more individuals of a household and/or a workplace, with the objects.

Implementation of at least some of the disclosed subject matter may lead to benefits including, but not limited to, a reduction in bandwidth (e.g., as a result of automatically determining the one or more objects that are close to being depleted, as a result of automatically determining the one or more shopping items corresponding to the one or more objects such that a need to navigate through and/or download various pages of an online shopping interface is decreased, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
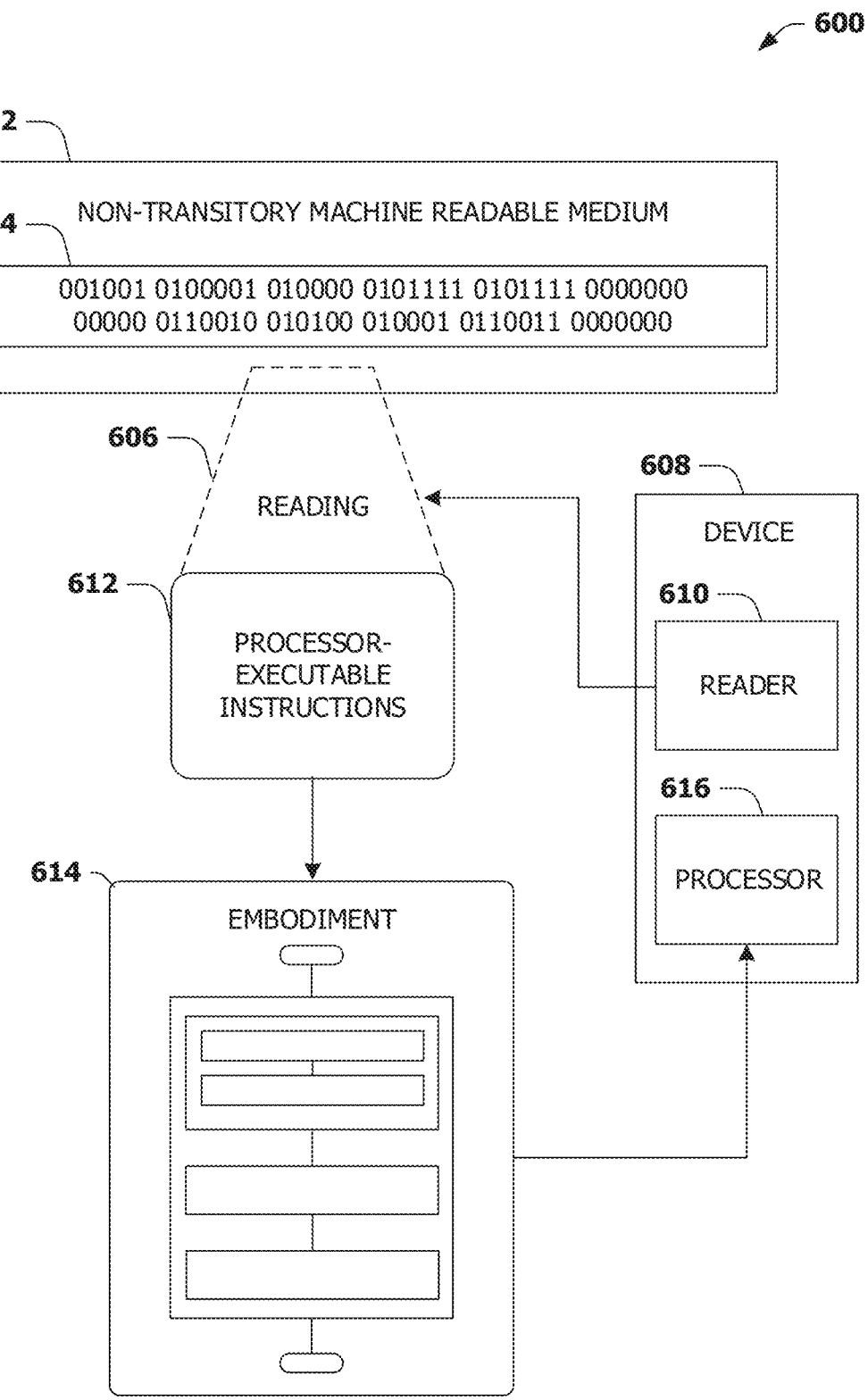
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving, from a first device comprising a first sensor, a first signal indicative of:
      a first identifier associated with a first object to which the first device is coupled, and
      one or more first properties, detected by the first sensor, corresponding to an acceleration associated with a first motion of the first object and a second acceleration associated with a second motion of the first object;
   receiving a second signal indicative of at least one of an ambient light level of ambient light of a space within which the first object is located, a change of the ambient light level or the ambient light level meeting a threshold ambient light level;
   determining, based upon the first identifier, the one or more first properties and at least one of the ambient light level, the change of the ambient light level or the ambient light level meeting the threshold ambient light level, a usage event associated with the first object, wherein the determining the usage event is based upon the acceleration associated with the first motion of the first object meeting a threshold acceleration level, wherein the second acceleration associated with the second motion of the first object is determined to not meet the threshold acceleration level; and
   determining usage information, indicative of an amount of time that the first object is used, based upon the usage event and one or more other usage events associated with the first object, wherein the amount of time comprises an average amount of time that the first object is used per duration of time over a plurality of usage sessions.

2. The method of claim 1, further comprising:
   receiving a third signal indicative of one or more second properties corresponding to at least one of a weight associated with the first object or a pressure associated with the first object; and
   determining a first status associated with the first object based upon the one or more second properties, wherein the determining the first status associated with the first object comprises:
      determining an amount of product stored inside the first object based upon at least one of the weight associated with the first object or the pressure associated with the first object.

3. The method of claim 1, further comprising:
receiving a third signal indicative of one or more second properties; and
determining a first status associated with the first object based upon the one or more second properties, wherein the determining the first status associated with the first object comprises:
determining an amount of product stored inside the first object based upon the one or more second properties.

4. The method of claim 1, wherein the one or more first properties comprise at least one of a strain associated with the first object or a stress associated with the first object.

5. The method of claim 1, wherein the amount of time comprises the average amount of time that the first object is used over the plurality of usage sessions.

6. The method of claim 3, further comprising:
comparing the amount of product with a threshold amount of product associated with the first object; and
storing an indication of the first object in a shopping list based upon a determination that the amount of product does not meet the threshold amount of product, wherein:
one or more objects indicated in the shopping list are associated with one or more amounts of product that do not meet one or more threshold amounts of product.

7. The method of claim 6, further comprising:
controlling a graphical user interface of a client device to display the shopping list.

8. The method of claim 6, further comprising:
analyzing, based upon one or more identifiers associated with the one or more objects, one or more shopping databases to identify one or more shopping items corresponding to the one or more objects; and
controlling a graphical user interface of a client device to display a shopping interface comprising an indication of the one or more shopping items and a selectable input corresponding to purchasing the one or more shopping items.

9. The method of claim 6, further comprising:
identifying a shopping store based upon a location associated with the first object;
analyzing a plurality of shopping items associated with the shopping store to identify one or more shopping items corresponding to the one or more objects; and
controlling a graphical user interface of a client device to display an indication of the shopping store and the one or more shopping items.

10. The method of claim 1, wherein the determining the usage event associated with the first object is based upon the change of the ambient light level from an initial ambient light level below the threshold ambient light level to a second ambient light level above the threshold ambient light level, the method further comprising:
receiving a third signal indicative of at least one of a third ambient light level of ambient light of the space within which the first object is located, a change of the third ambient light level or the third ambient light level meeting the threshold ambient light level; and
determining, based upon the change of the ambient light level from the second ambient light level above the threshold ambient light level to the third ambient light level below the threshold ambient light level, a second usage event associated with the first object, wherein the second usage event is different than the usage event.

11. A system, comprising:
a first device coupled to a first object, the first device comprising:
a first sensor configured to detect one or more first properties of the first object comprising an acceleration of motion of the first device,
wherein the first device is configured to:
perform sensing to attempt to detect one or more client devices configured for reception of a signal indicative of the one or more first properties comprising the acceleration of motion of the first device;
determine that the acceleration of motion of the first device meets a threshold acceleration level;
determine at least one of an ambient light level of ambient light of a space within which the first object is located, a change of the ambient light level or the ambient light level meeting a threshold ambient light level;
generate a first signal based upon a combination of (i) an indication of at least one of the acceleration of motion of the device or the acceleration of the device meeting the threshold acceleration level, (ii) a first identifier associated with the first object and (iii) and at least one of the ambient light level, the change of the ambient light level or the ambient light level meeting the threshold ambient light level; and
store at a first time the first signal in memory of the first device upon not detecting one or more client devices configured for reception of the first signal; and
a first transmitter configured to transmit, to a client device, the first signal indicative of the combination of (i) the indication of at least one of the acceleration of motion of the device or the acceleration of the device meeting the threshold acceleration level and (ii) the first identifier associated with the first object upon detecting the client device at a second time after the first time, wherein the first device is powered by motion of the first device.

12. The system of claim 11, wherein the one or more first properties correspond to at least one of a weight associated with the first object or a pressure associated with the first object.

13. The system of claim 11, wherein the one or more first properties correspond to at least one of motion of the first device, or an ambient light level.

14. The system of claim 11, wherein the first device is further powered by at least one of:
a battery;
a capacitor; or
fluctuations in ambient electromagnetic energy.

15. The system of claim 11, wherein the first device is attached to the first object using an adhesive.

16. The system of claim 11, wherein:
the first object corresponds to a container comprising a product; and
the one or more first properties are indicative of an amount of product of the product.

17. The system of claim 11, wherein:
the one or more first properties correspond to a level of a property associated with the first object; and
a usage event associated with the first object is determined based upon the level of the property associated with the first object meeting a threshold level of the property.

18. A non-transitory machine readable medium having stored thereon processor-executable instructions that when executed cause performance of operations, the operations comprising:
- receiving, from a first device comprising a first sensor, a first signal indicative of:
  - a first identifier associated with a first object to which the first device is coupled, and
  - one or more first properties, detected by the first sensor, corresponding to an acceleration associated with a first motion of the first object and a second acceleration associated with a second motion of the first object;
- receiving a second signal indicative of at least one of an ambient light level of ambient light of a space within which the first object is located, a change of the ambient light level or the ambient light level meeting a threshold ambient light level; and
- determining, based upon the first identifier, the one or more first properties and at least one of the ambient light level, the change of the ambient light level or the ambient light level meeting the threshold ambient light level, a first status associated with the first object, wherein the determining the first status is based upon the acceleration associated with the first object meeting a threshold acceleration level, wherein the second acceleration associated with the second motion of the first object is determined to not meet the threshold acceleration level, the first status indicative of an amount of time that the first object is used, wherein the amount of time comprises an average amount of time that the first object is used per duration of time over a plurality of usage sessions.

19. The non-transitory machine readable medium of claim 18,
wherein the determining the first status associated with the first object is based upon the change of the ambient light level from an initial ambient light level to a second ambient light level.

20. The non-transitory machine readable medium of claim 18,
wherein the determining the first status associated with the first object is based upon the ambient light level meeting the threshold ambient light level.

* * * * *